(12) United States Patent
Janney

(10) Patent No.: US 8,881,454 B2
(45) Date of Patent: Nov. 11, 2014

(54) AGRICULTURE PRODUCTION SYSTEM WITH TEMPERATURE CONTROLLED ROOT ZONE

(71) Applicant: INOAG, LLC, La Habra Heights, CA (US)

(72) Inventor: Matthew Daniel Janney, La Habra Heights, CA (US)

(73) Assignee: INOAG, LLC, La Habra Heights, CA (US)

( * ) Notice: Subject to any disclaimer, the term of this patent is extended or adjusted under 35 U.S.C. 154(b) by 0 days.

(21) Appl. No.: 14/192,572

(22) Filed: Feb. 27, 2014

(65) Prior Publication Data

US 2014/0259916 A1    Sep. 18, 2014

Related U.S. Application Data

(60) Provisional application No. 61/777,437, filed on Mar. 12, 2013.

(51) Int. Cl.
*A01G 31/00* (2006.01)
*A01G 27/00* (2006.01)

(52) U.S. Cl.
CPC .................. *A01G 27/00* (2013.01)
USPC ........................................ 47/62 A

(58) Field of Classification Search
USPC .............. 47/62 A, 66.6, 79, 66.7, 62 R
See application file for complete search history.

(56) References Cited

U.S. PATENT DOCUMENTS

| | | | |
|---|---|---|---|
| 3,109,258 A | 11/1963 | Jensen | |
| 3,220,194 A | 11/1965 | Lienard | |
| 3,757,469 A | 9/1973 | Smith et al. | |
| 3,990,181 A | 11/1976 | do Valle | |
| 4,188,154 A | 2/1980 | Izatt | |
| 4,330,222 A | 5/1982 | Klein | |
| 4,332,105 A | 6/1982 | Nir | |
| 4,726,143 A | 2/1988 | Steinbeck | |
| 4,869,019 A | 9/1989 | Ehrlich | |
| 4,920,694 A | 5/1990 | Higa | |
| 4,930,934 A | 6/1990 | Adkins | |

(Continued)

OTHER PUBLICATIONS

Milwaukee Sentinel, "Potted Plants Suffer From Heat, Too", Jul. 23 1966, Part 3 p. 7, 1 page. http://news.google.com/newspapers?nid=1368&dat=19660723&id=JnhQAAAAIBAJ&sjid=VBEEAAAAIBAJ&pg=7264,4593867.*

*Primary Examiner* — Monica Williams
(74) *Attorney, Agent, or Firm* — Knobbe Martens Olson & Bear, LLP

(57) ABSTRACT

An agriculture production system includes a plurality of plant housings interconnected by conduit portions of a conduit assembly. Each plant housing has an upper housing portion that supports a plant in a growing media therein and a lower housing portion defining a chamber cavity below the upper housing portion so that roots of the plant extend into the chamber, said conduit portions fluidly interconnecting the chambers of the plant housings. A conditioned air unit is coupled to the conduit assembly and conditions air that flows through the conduit assembly into the chambers of the plant housings. A water supply assembly has a plurality of irrigation units, each associated with one of the plant housings and delivering water to the plant housing from a water supply source. The plant housings are arranged in a circuit allowing conditioned air to flow through the chambers of the plant housings to control a temperature and/or humidity in said chambers to promote root development and plant growth.

20 Claims, 18 Drawing Sheets

(56) References Cited

U.S. PATENT DOCUMENTS

| | | | |
|---|---|---|---|
| 5,282,873 A * | 2/1994 | Watari | 47/1.01 R |
| 5,303,503 A | 4/1994 | Patterson | |
| 5,724,768 A | 3/1998 | Ammann, Jr. | |
| 6,173,526 B1 | 1/2001 | Mazzei | |
| 6,360,480 B1 | 3/2002 | Christensen | |
| 6,890,126 B2 | 5/2005 | Mazzei | |
| 7,040,839 B1 | 5/2006 | Mazzei | |
| 7,128,278 B2 | 10/2006 | Archambeau et al. | |
| 7,784,217 B2 | 8/2010 | San Solo et al. | |
| 7,823,328 B2 | 11/2010 | Walhovd | |
| 8,157,972 B2 | 4/2012 | Hegel et al. | |
| 8,225,549 B2 | 7/2012 | Simmons | |
| 8,261,486 B2 | 9/2012 | Bissonnette et al. | |
| 2006/0053691 A1 | 3/2006 | Harwood et al. | |
| 2006/0156624 A1 | 7/2006 | Roy et al. | |
| 2007/0113472 A1 | 5/2007 | Plowman | |
| 2011/0192082 A1 * | 8/2011 | Uchiyama | 47/66.6 |
| 2012/0005957 A1 * | 1/2012 | Downs, Sr. | 47/62 A |
| 2012/0090236 A1 * | 4/2012 | Orr | 47/62 A |

* cited by examiner

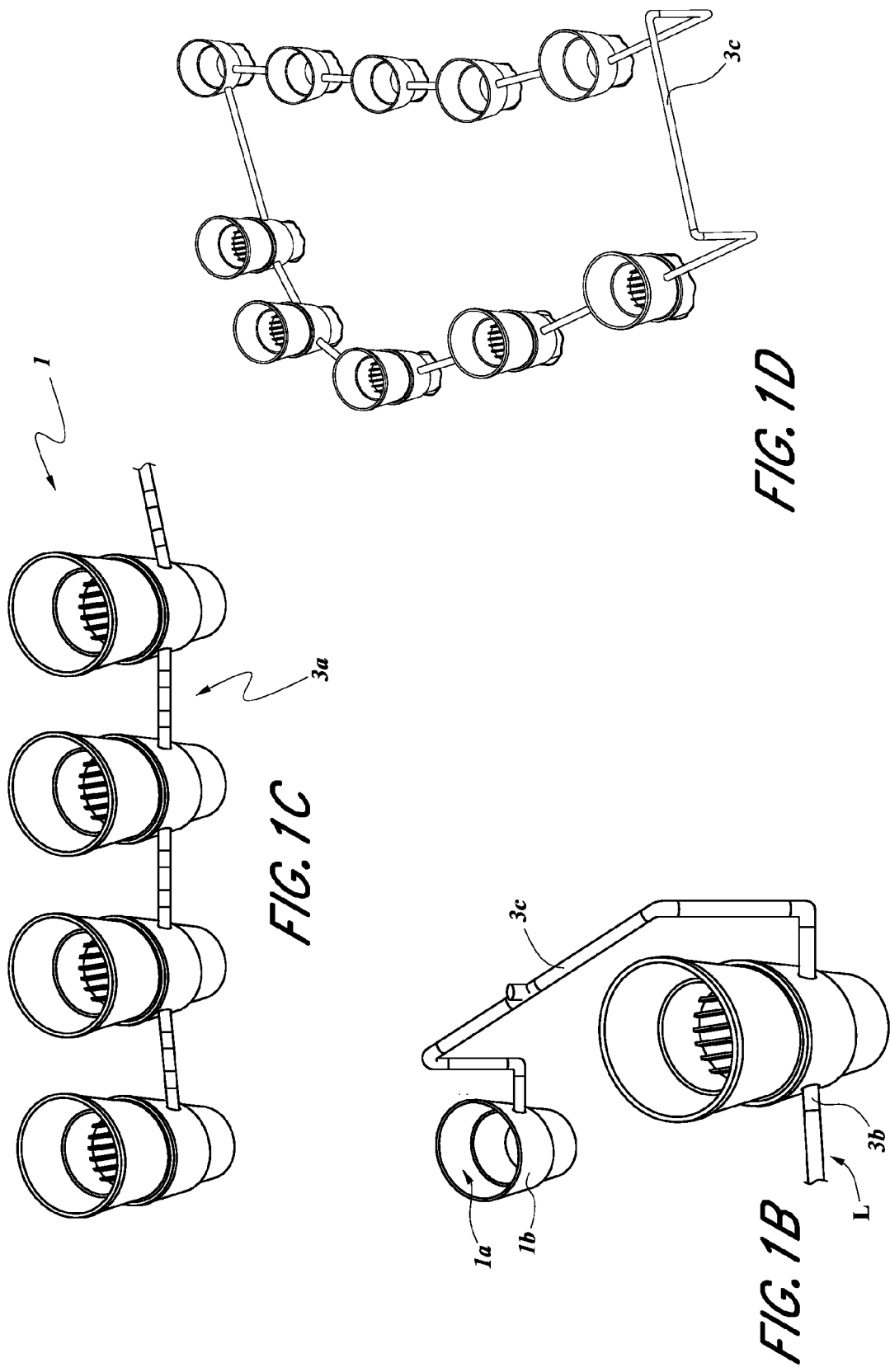

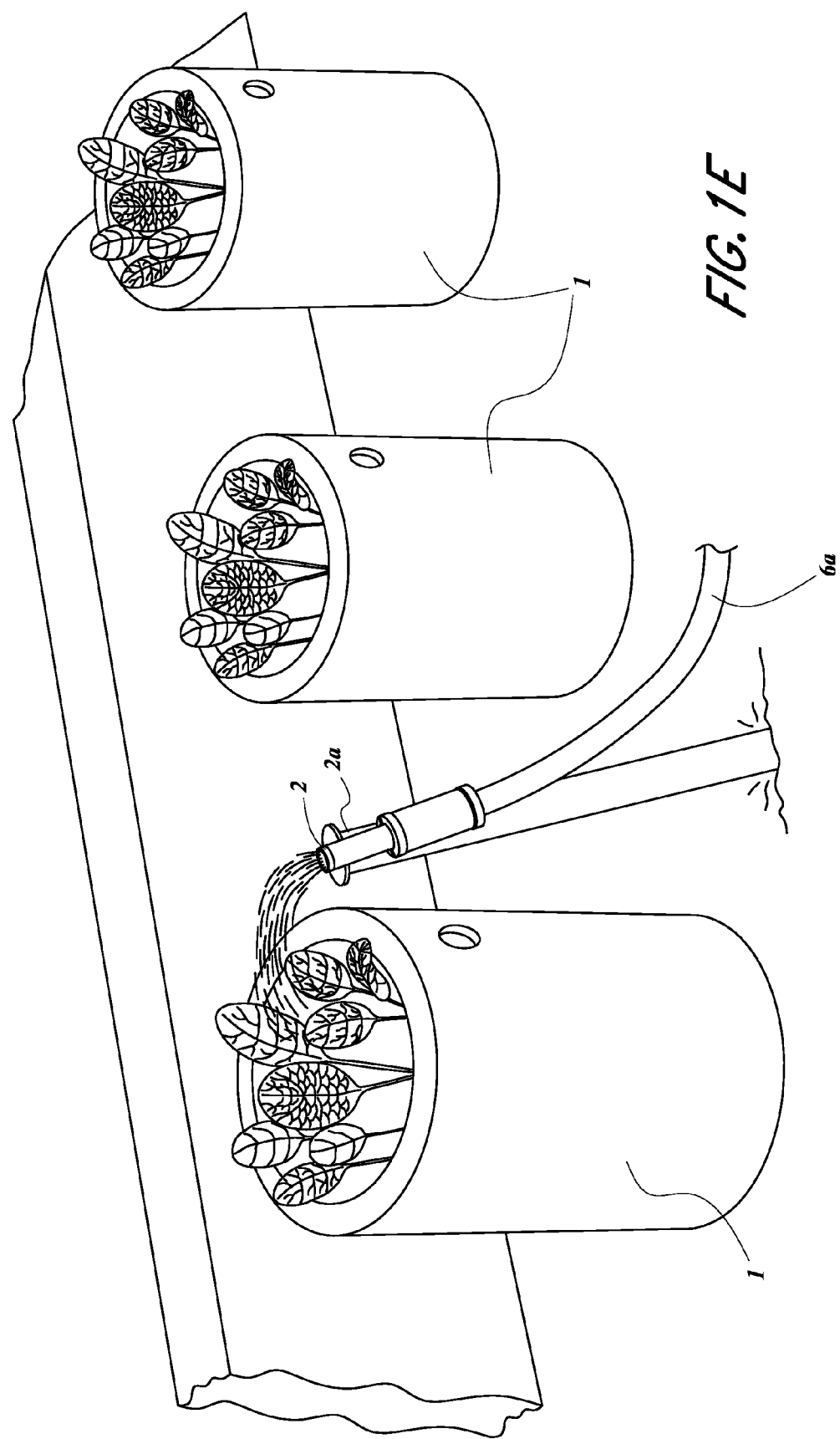

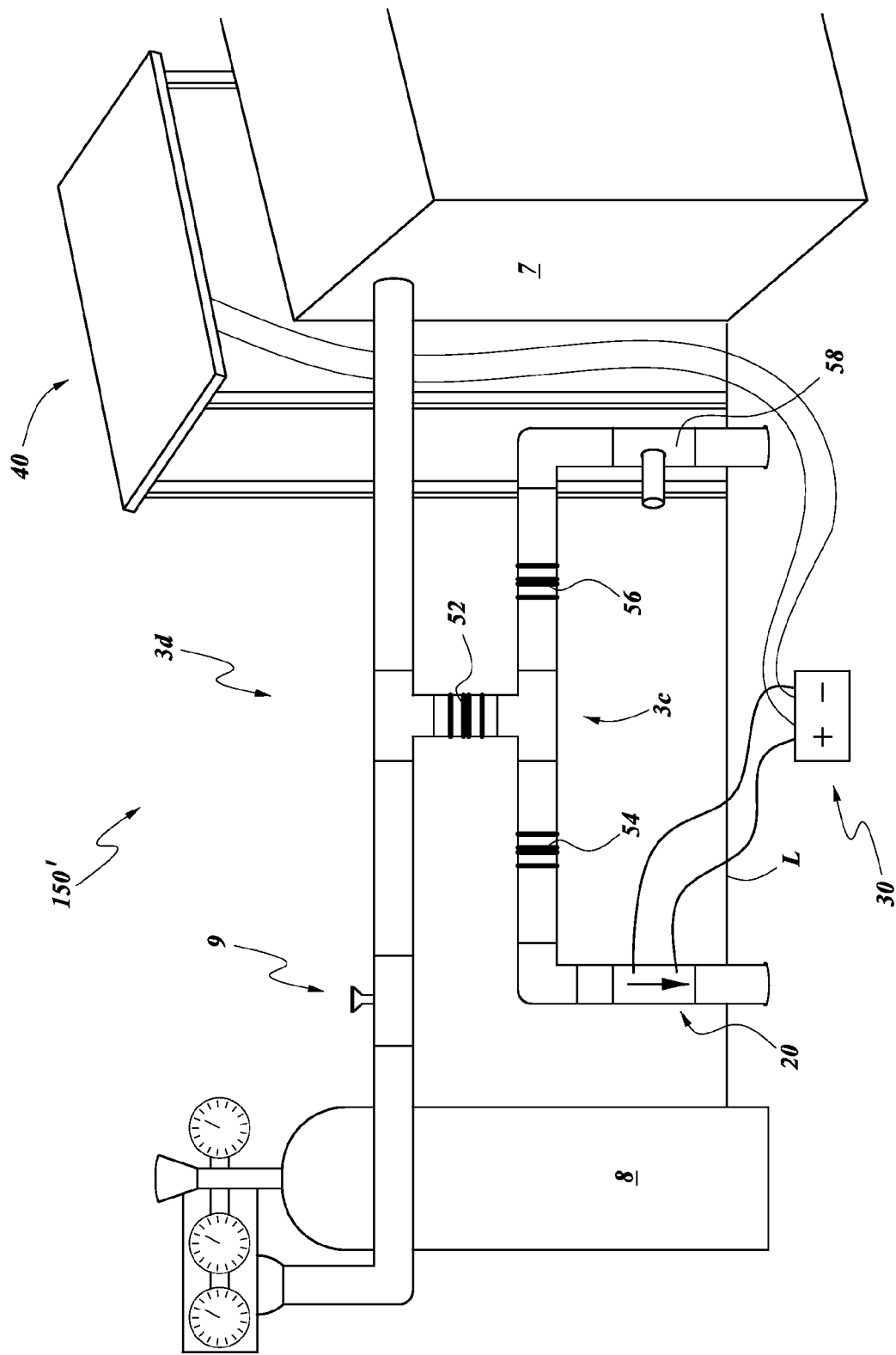

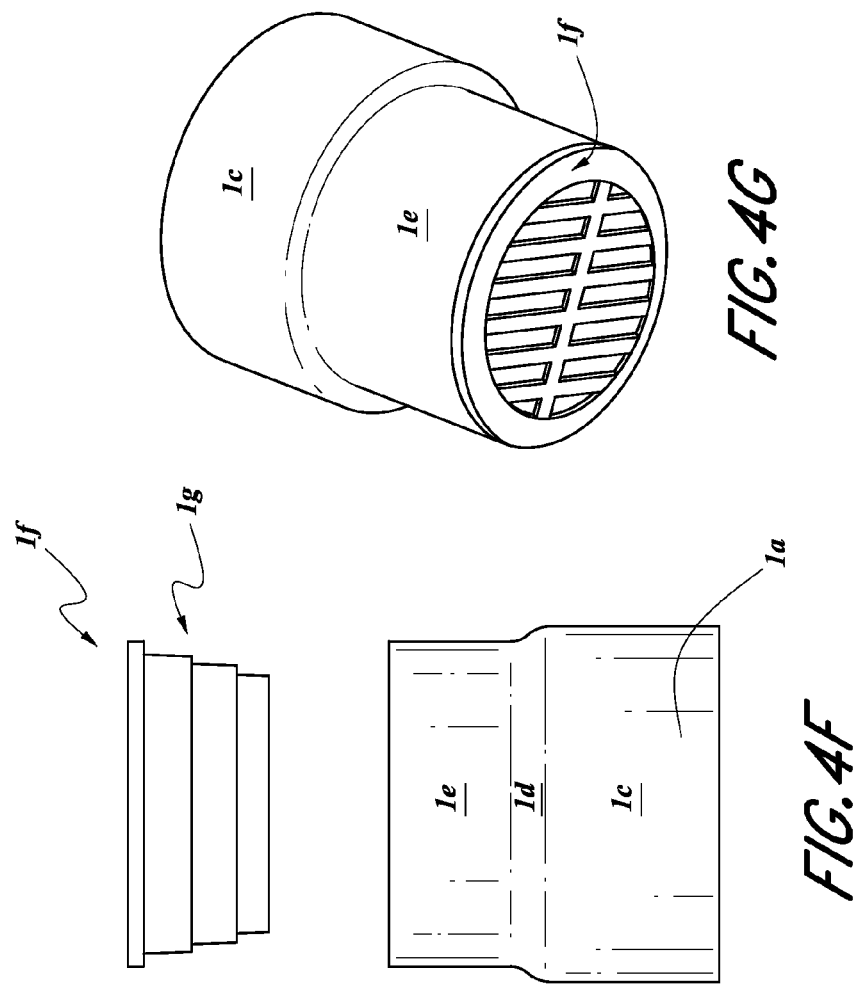
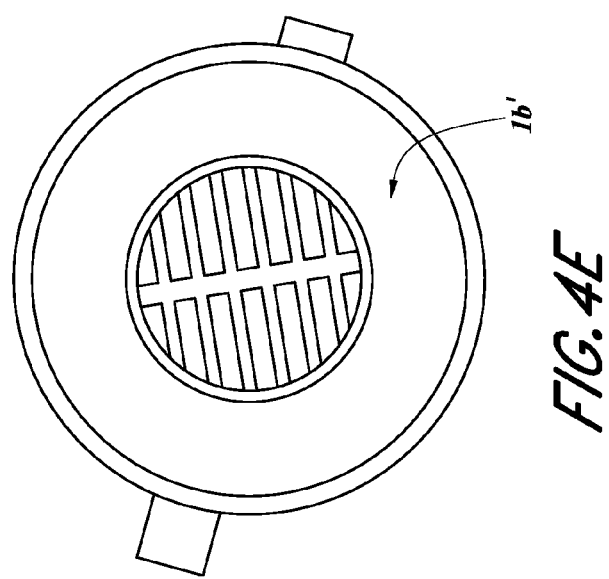

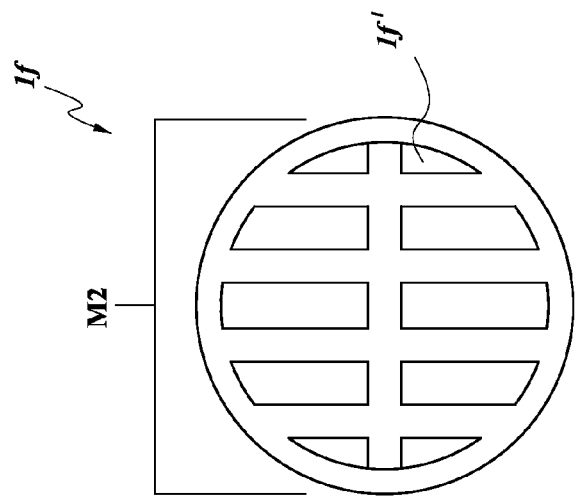
FIG.9C
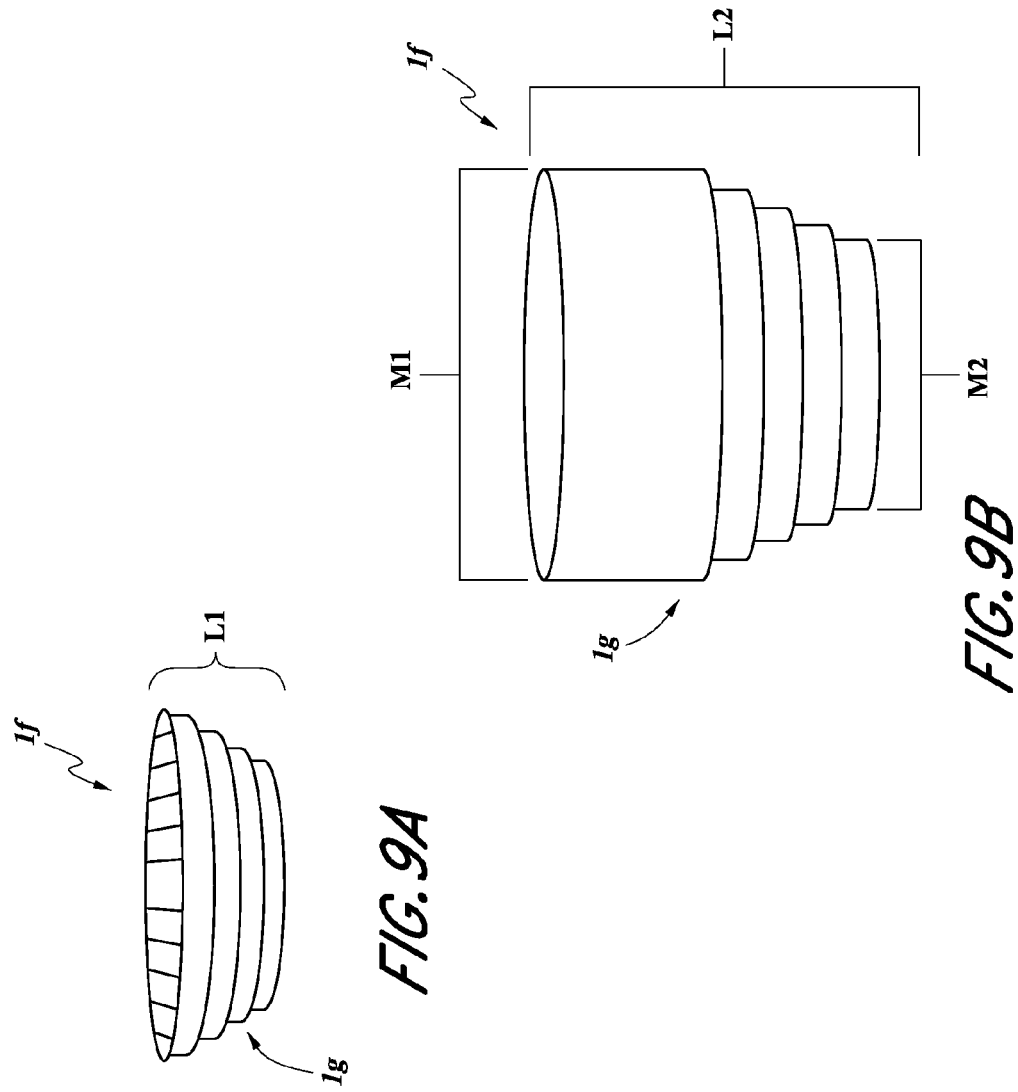
FIG.9B
FIG.9A

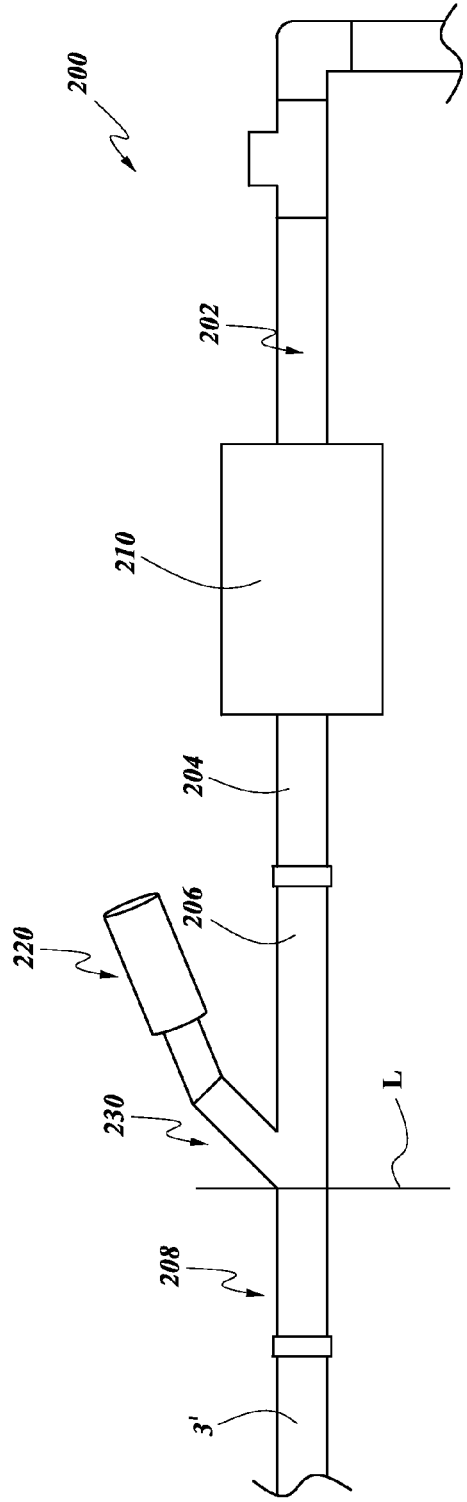
FIG. 12
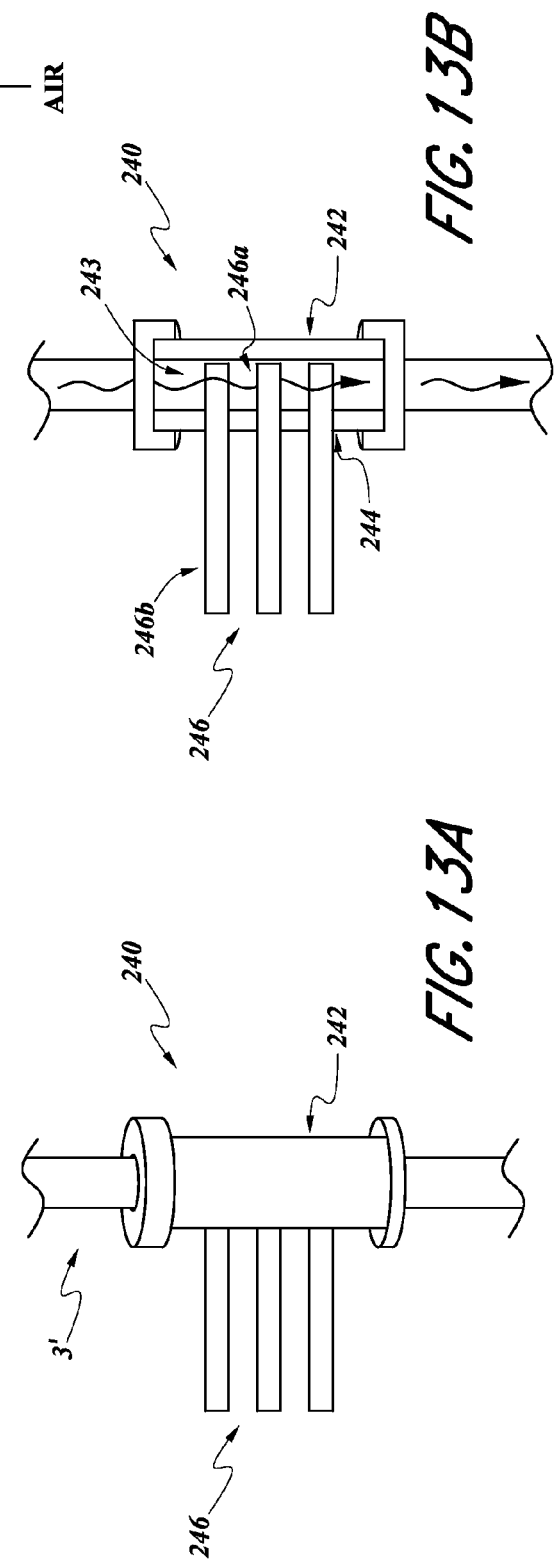
FIG. 13A
FIG. 13B

AGRICULTURE PRODUCTION SYSTEM WITH TEMPERATURE CONTROLLED ROOT ZONE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of U.S. Provisional Application No. 61/777,437, filed Mar. 12, 2013 and titled AGRICULTURE PRODUCTION SYSTEM WITH TEMPERATURE CONTROLLED ROOT ZONE, the entirety of which is incorporated by reference and should be considered a part of this specification.

BACKGROUND

1. Field

The present application relates to agriculture productions systems, and more particularly to agriculture production systems with a temperature, nutrient and/or element (e.g., micronutrient, macronutrient) controlled root zone.

2. Description of the Related Art

The continued growth in the world's population has increased the demand for food production, and the need for greater agricultural production systems and methods that allow agricultural production on otherwise arid land (e.g., desert). Conventional agricultural (geoponic) systems, where plants are grown in soil are not suitable for use in arid land (e.g., in a desert). Existing hydroponic systems are likewise unsuitable for use in arid land. Additionally, existing aeroponic systems are not suitable for large scale agricultural production on arid land.

SUMMARY

Accordingly, there is a need for an improved agriculture production system that can be used to grow plants on arid land (e.g., in a desert).

The system and method disclosed herein can advantageously allow a user to grow plants in arid conditions unsuitable for agriculture (e.g., desert). Additionally, the systems and methods disclosed herein can advantageously facilitate and enhance the growth of plants relative to plants grown in traditional soil based agriculture by controlling the temperature and environment (e.g., humidity) of the root zone of the plant, along with increasing the efficiency in water use by directing water through gravity into the upper soil profile and lower chamber of the plant housings, thereby avoiding water run-off or dispersion.

In accordance with one embodiment, an agriculture production system is provided. The system comprises a plurality of plant housings interconnected by conduit portions of a conduit assembly. Each of the plant housings comprises an upper housing portion configured to support a plant in a growing media therein and a lower housing portion defining a chamber cavity below the upper housing portion so that one or more roots of the plant extend into the chamber, said conduit portions fluidly interconnecting the chambers of the plurality of plant housings. The system also comprises a conditioned air unit coupled to at least a portion of the conduit assembly and configured to condition air that flows through the conduit assembly into the chambers of the plurality of plant housings. The system also comprises a water supply assembly comprising a plurality of irrigation units, where each irrigation unit is associated with one of the plurality of plant housings and configured to deliver water to its associated plant housing from a water supply source. The plurality of plant housings are arranged in a circuit allowing conditioned air to flow through the chambers of the plurality of plant housings to thereby control one or both of a temperature and humidity in said chambers to promote root development and plant growth.

In accordance with another embodiment, an agriculture production system is provided. The system comprises a plurality of plant housings interconnected by conduit portions of a conduit assembly. Each of the plant housings comprises an upper housing portion configured to support a plant in a growing media therein and a lower housing portion defining a chamber cavity below the upper housing portion so that one or more roots of the plant extend into the chamber, said conduit portions fluidly interconnecting the chambers of the plurality of plant housings. The system also comprises a conditioned air unit coupled to at least a portion of the conduit assembly and configured to condition air that flows through the conduit assembly into the chambers of the plurality of plant housings. The system also comprises an oxygen source coupled to the conduit assembly and configured to selectively direct a flow of oxygen into the chambers of the plurality of plant housings via the conduit assembly to expose the root zone in each chamber to said oxygen flow. The system also comprises a water supply assembly comprising a plurality of irrigation units, where each irrigation unit is associated with one of the plurality of plant housings and configured to deliver water to its associated plant housing from a water supply source. The plurality of plant housings are arranged in a circuit allowing conditioned air and oxygen to flow through the chambers of the plurality of plant housings to thereby control one or both of a temperature and humidity in said chambers to promote root development and plant growth.

BRIEF DESCRIPTION OF THE DRAWINGS

Other features and advantages of the present invention will be apparent from the following detailed description of the invention, taken in conjunction with the accompanying drawings of which:

FIG. 1B is a partial view of the system of FIG. 1A.

FIG. 1C is a partial view of the system of FIG. 1A.

FIG. 1D is a partial view of the system of FIG. 1A.

FIG. 1E is a perspective view of one embodiment of an irrigation arrangement for use with the system of FIG. 1A.

FIG. 2A is a schematic partial view of another embodiment of an agriculture production system.

FIG. 4E is a top view of the plant housing in FIG. 4C.

FIG. 4F is an exploded view of a soil holding unit for use with the plant housing of FIG. 4C.

FIG. 4G is a perspective bottom view of the soil holding unit of FIG. 4F.

FIG. 9A is a schematic side view of another embodiment of a soil holding unit of one embodiment of a plant housing for use with an agriculture production system.

FIG. 9B is a schematic side view of one embodiment of a soil holding unit of one embodiment of a plant housing for use with an agriculture production system.

FIG. 9C is a top planar view of one embodiment of a grate of a soil holding unit for a plant housing for use with an agriculture production system.

FIG. 12 is a schematic partial view of another embodiment of an agriculture production system.

FIG. 13A is a schematic side view of a component of another embodiment of an agriculture production system.

FIG. 13B is a schematic cross-sectional view of the component of FIG. 13A.

DETAILED DESCRIPTION

Figure 1A:
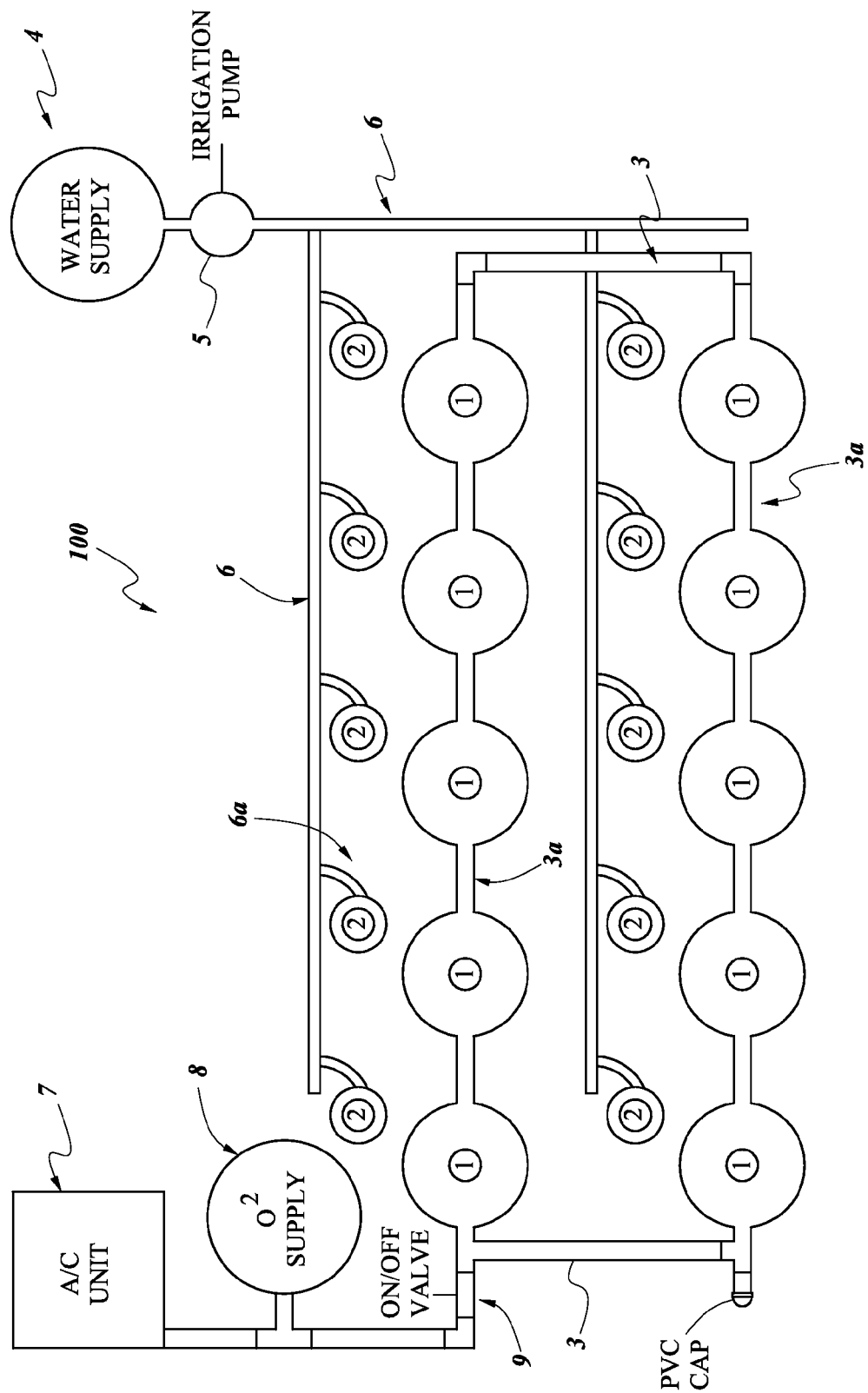
FIG. 1A is a schematic top planar view of one embodiment of an agriculture production system.

FIG. 1A shows one embodiment of an agriculture production system 100. The system can include one or more plant housings 1 interconnected via a conduit assembly 3 (e.g., PVC pipe, plastic tubing, rubber tubing, etc.). The system 100 can also include one or more irrigation heads 2 in fluid communication with a water supply 4 (e.g., water tank, municipal water source, river) via a pump 5. In the illustrated embodiment, the system 100 can have a plurality of plant housings 1 and a plurality of corresponding irrigation heads 2. In another embodiment, more than one irrigation head 2 can be associated with each plant housing 1.

The system 100 can supply irrigation water to the one or more plant housings 1 via the one or more irrigation heads 2 by operating the pump 5 to deliver water from the water supply 4. In one embodiment, the one or more irrigation heads 2 direct water directly onto the top of the housings 1 (or in some embodiments direct water into the housings 1 underneath the soil line), thereby providing increased efficiency in water use by directing water through gravity into the upper soil profile and lower chamber of the plant housings 1, thus avoiding water run-off or dispersion. One or more irrigation header assemblies 6 can fluidly connect the pump 5 to the one or more irrigation heads 2 to distribute the irrigation water to the irrigation heads 2. In one embodiment, the pump 5 can be a self-priming electric pump. However, in other embodiments, other suitable pump types can be used, such as positive displacement pumps (e.g., manually operated or operated by an electric motor). The pump 5 can be disposed adjacent the water supply source 4. In one embodiment, the pump 5 can be fully submerged (e.g., inside the water supply source 4). In another embodiment, the pump 5 can be connected via a conduit (e.g., PVC tubing) with the water supply source 4.

The system can also include an air conditioning (AC) unit 7 in fluid communication with the one or more plant housings 1 via the conduit assembly 3, where adjacent plant housings 1 are interconnected with conduit portions 3a. The AC unit 7 can be a conventional AC unit (e.g., electrically powered) that can provide conditioned air to at least a portion (e.g., a lower portion) of the one or more plant housings 1 via the conduit assembly 3.

In one embodiment, an oxygen source 8 (e.g., an oxygen tank 8, providing for example medical grade oxygen) can also be in fluid communication with the one or more plant housings 1 via the conduit assembly 3. In the illustrated embodiment, the AC unit 7 and oxygen source 8 can connect to the conduit assembly 3 via one or more valves 9 selectively actuatable to allow flow of conditioned air and/or oxygen to flow through the conduit assembly 3 and into the one or more plant housings 1, as described further herein. In one embodiment, the one or more valves 9 can be manually actuated by a user. In another embodiment, the one or more valves 9 can be controlled by a controller (e.g., an electronic controller).

With continued reference to FIG. 1A, the one or more plant housings 1 can be arranged and interconnected with the conduit assembly 3 to form a closed circuit for providing conditioned air and/or oxygen to the one or more plant housings 1. Advantageously, as discussed below, this arrangement allows for conditioned air to be provided to a plurality of plants to facilitate and speed-up plant growth. Additionally, as the conduit assembly 3 forms a closed circuit through which conditioned air and/or oxygen can circulate, the supply of conditioned air and/or oxygen into the closed circuit can be efficiently controlled.

FIGS. 1B-1D show additional views of the one or more plant housings 1 during installation. As shown, each of the plant housings 1 can have an upper housing portion 1a disposed above one or more (e.g., a pair of) conduit connectors 3b and a lower housing portion 1b disposed below the conduit connectors 3b (see e.g., FIGS. 4A-4B). The upper housing portion 1a can in one embodiment be a soil holding unit for supporting the plant in soil (e.g., loamy or clay soil, or sand). In other embodiments, the plant can be supported in horticultural Rockwool or grow cubes, which can be held in the upper housing portion 1a. The conduit assembly 3 can in one embodiment include a plurality of PVC portions (e.g., conduit portions 3a) interconnected with each other (e.g., via elbow and tee portions) to define the closed conduit circuit. FIG. 1C shows a plurality of plant housings 1 at least partially inserted below a soil line L before soil is used to cover the conduit assembly 3. FIG. 1D shows two rows of plant housings 1 once the conduit assembly 3 has been buried under the soil line L, except for a proximal conduit portion 3c (e.g., ½ inch PVC portion) that connects to the AC unit 7 and/or oxygen source 8. In one embodiment, to promote oscillation of air and/or oxygen in the chambers 1b', a small electric motor can be coupled to a fan to force air through the conduit assembly 3 (e.g., force air in a desired direction through the conduit assembly 3). In another embodiment, the fan can be battery operated (e.g., with rechargeable batteries). In still another embodiment, the fan can be operated via solar power by one or more solar panels electrically connected to the fan, AC unit 7 and/or pump 5.

FIG. 1E shows one embodiment of an irrigation arrangement for a plant housing 1. In the illustrated embodiment, the irrigation head 2 is supported (e.g., via a support member 2a) adjacent the plant housing 1 (e.g., in close proximity to the plant housing 1) such that the irrigation head directs water above the soil line to a location proximate to the plant (e.g., into the upper housing portion 1a of the plant housing 1). In one embodiment, the one or more irrigation header assemblies 6 (see FIG. 1A) can have a plurality of irrigation tubes 6a (e.g., low flow irrigation tubes) connected thereto (e.g., using nipples that can be connected to the irrigation header assembly 6 with a tool that punctures holes in the header assembly 6).

Figure 2:
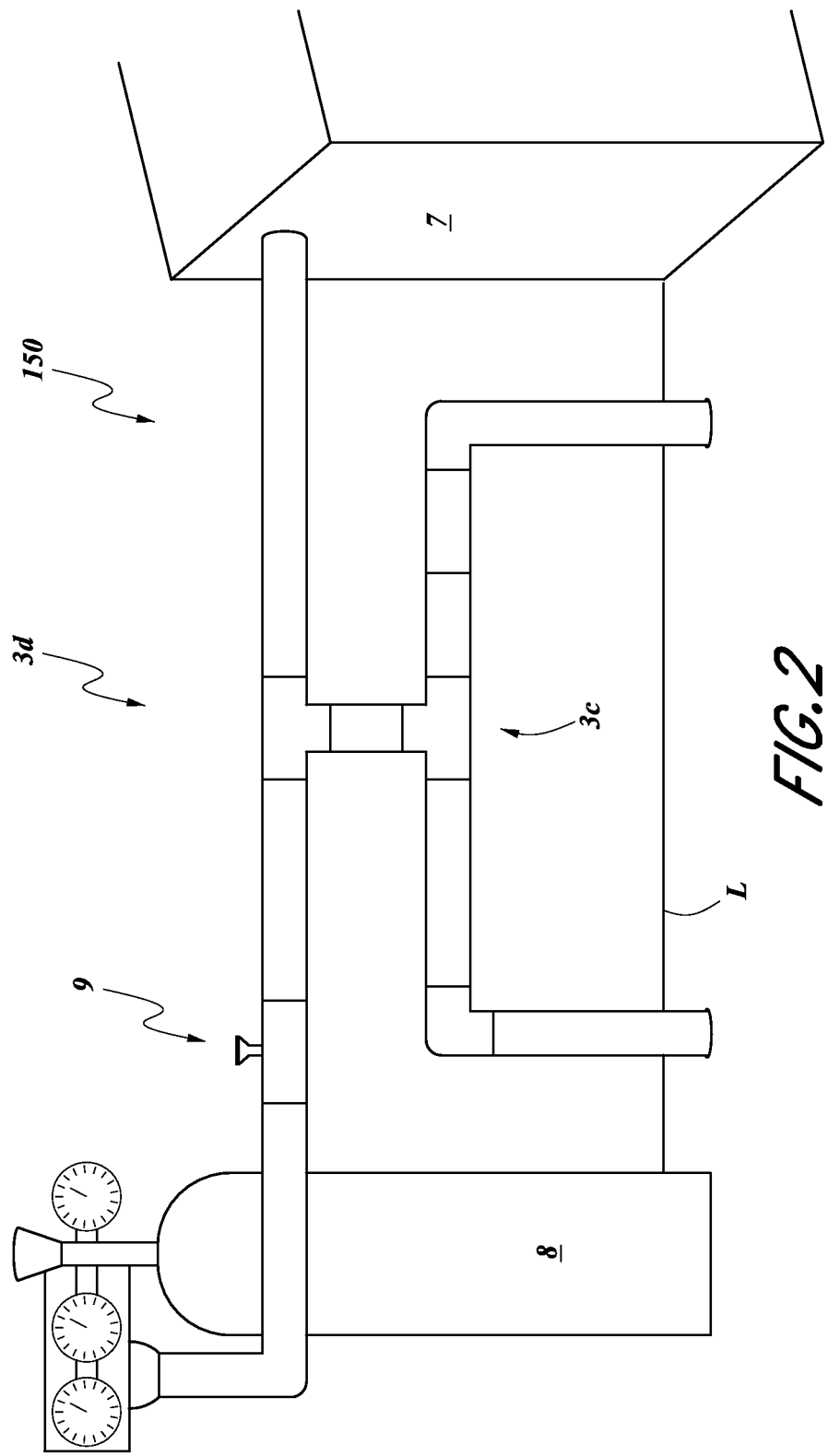
FIG. 2 is a schematic partial view of one embodiment of an agriculture production system.

FIG. 2 shows one embodiment of a conditioned air arrangement 150 for use with the system 100. In the illustrated embodiment, the proximal conduit portion 3c that extends above the soil line L can connect to the AC unit 7 and oxygen source 8 via one or more connectors (e.g., PVC connector) and one or more conduits. In one embodiment, the AC unit 7 can be provided on one side of a tee connector 3d and the oxygen source 8 can be provided on an opposite side of the tee connector 3d. The valve 9 can be disposed between the oxygen source 8 and the tee connector 3d and can be selectively actuated to allow flow of oxygen into the conduit connector 3c and into the rest of the conduit assembly 3 and plant housings 1. In one embodiment, the oxygen source 8 can be an oxygen tank having a tank regulator for regulating the amount of oxygen introduced into the conduit assembly 3.

With continued reference to FIG. 2, in operation the valve 9 can be closed and the AC unit 7 operated to provide conditioned air to the one or more plant housings 1 via the conduit assembly 3. As shown in FIG. 1A, conditioned air would flow through the proximal conduit portion 3c, along a first row of plant housings 1, and then flow along the second row of plant housing 1. As the conduit assembly 3 and plant housings 1 are arranged in a closed circuit system, conditioned air introduced through the conduit assembly 3 would be recirculated along the plurality of plant housings 1. In another embodiment, the valve 9 can be opened to allow flow of conditioned air from the AC unit 7 as well as flow of oxygen from the oxygen source 8 through the conduit assembly 3 so that it is recirculated along the closed circuit and plurality of plant housings 1. In one embodiment, a gas box, such as the gas box 10 (see FIG. 3) can be coupled to the proximal conduit portion 3c to deliver one or more nutrients (e.g., in gas form) to the chambers 1b' in the plant housings 1, as discussed further below.

FIG. 2A shows another embodiment of a conditioned air arrangement 150' for use with the system 100. The conditioned air arrangement 150' is similar to the conditioned air arrangement 150 of FIG. 2, except as described below. In the illustrated embodiment, the conditioned air arrangement 150' can include a fan 20 that can be disposed inline in a portion of the proximal conduit portion 3c (e.g., in one branch of the proximal conduit portion 3c) and disposed downstream of the oxygen source 8 and AC unit 7. The fan 20 can be electrically connected to a battery 30, which can provide power to the fan 20 to operate the fan 20. The battery 30 can be electrically connected to a solar panel 40, which can supply power to the battery 30 (e.g., to recharge the battery 30). In one embodiment, the solar panel 40 can be a 10 W solar panel. In use, in one embodiment, the battery 30 can hold charge overnight and recharge during daytime via the solar panel 40 to thereby power the fan 20 at all times, thus providing continuous airflow through the conduit assembly 3 and the chambers 1b' of the one or more housings 1. The conditioned air arrangement 150' can also have a valve 52 downstream of the oxygen source 8 and AC unit 7 that can be actuated to isolate the oxygen source 8 and AC unit 7 from the conduit assembly 3, and a pair of valves 54, 56 downstream of the valve 52 and on separate branches of the proximal conduit portion 3c, where the valves 54, 56 can each be selectively actuated to allow flow to recirculate within the conduit assembly 3 (e.g., if both valves 54, 56 are in the open position) or to disallow recirculation of air within the conduit assembly 3 (e.g., if valve 56 is closed and valve 54 is open). The conditioned air arrangement 150' can also include a relief valve 58 that can be selectively operated to release air from the conduit assembly 3 when conditioned air is added to the system 100 (e.g., air flow provided just by the fan 20 or in combination with flow of oxygen from the oxygen source 8 and/or air from the AC unit 7), but where recirculation of air flow is disallowed (e.g., by having valve 56 closed).

Figure 3:
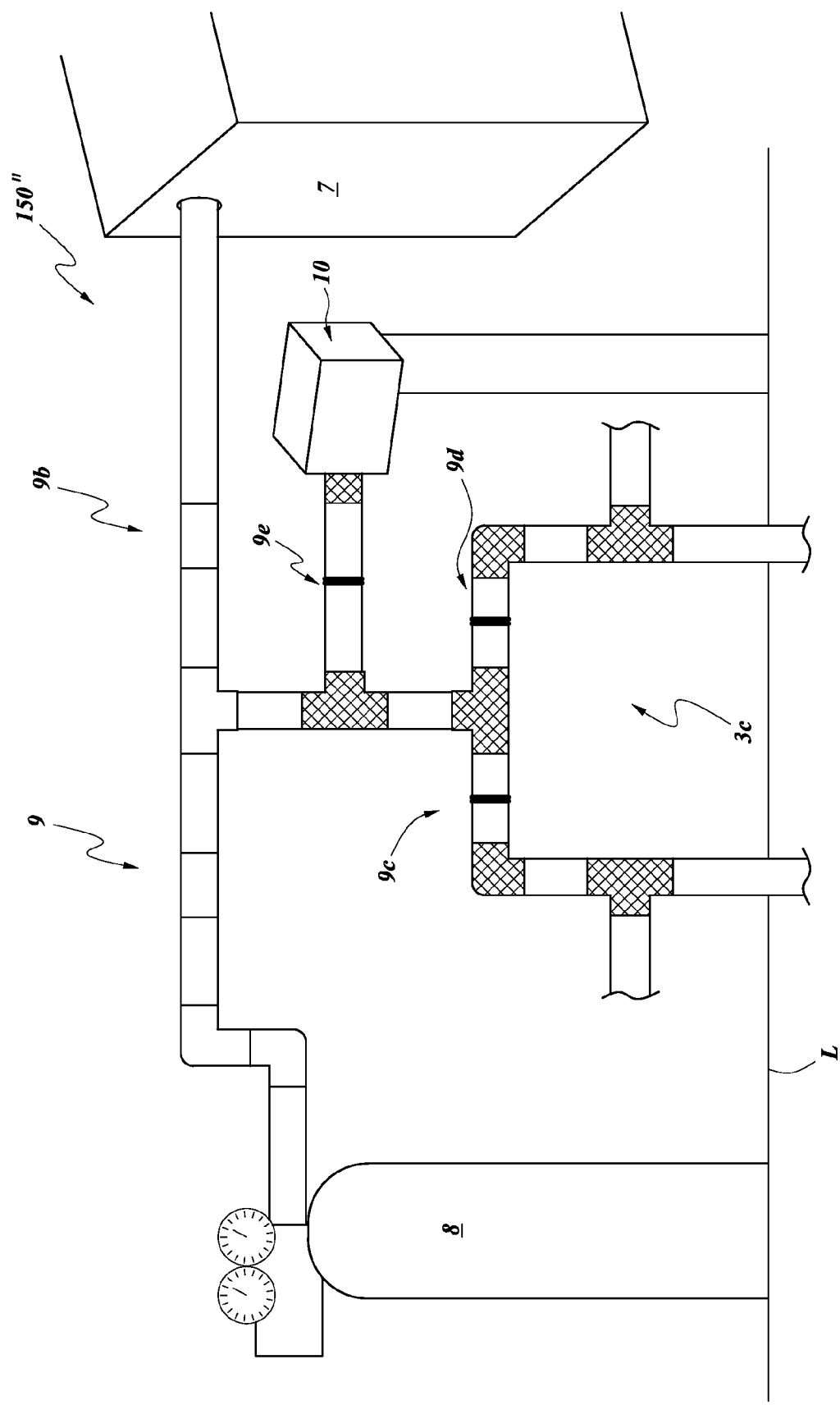
FIG. 3 is a schematic partial view of another embodiment of an agriculture production system.

FIG. 3 shows another embodiment of a conditioned air arrangement 150" for use with the system 100. The conditioned air arrangement 150" is similar to the conditioned air arrangement 150 in FIG. 2, except as described below. In the illustrated embodiment, the proximal conduit portion 3c that extends above the soil line L can connect to the AC unit 7 and oxygen source 8 via one or more connectors (e.g., PVC connector), one or more conduits and one or more valves. The AC unit 7 can be provided on one side of the tee connector 3d and the oxygen source 8 can be provided on an opposite side of the tee connector 3d. The valve 9 can be disposed between the oxygen source 8 and the tee connector 3d and can be selectively actuated to allow flow of oxygen into the proximal conduit portion 3c and into the rest of the conduit assembly 3 and plant housings 1. A valve 9B can be disposed between the AC unit 7 and the tee connector 3d and can be selectively actuated to allow flow of conditioned air into the proximal conduit portion 3c and into the rest of the conduit assembly 3 and plant housings 1. Valves 9C, 9D can be disposed in the proximal conduit portion 3c disposed above the soil line L. The valves 9C, 9D can be selectively actuated (e.g., by a user) to allow flow conditioned air and/or oxygen (depending on whether valves 9 and 9B are open or closed) into one or both of the conduit branches of the closed circuit. Accordingly, the valves 9C, 9D can be selectively actuated to provide conditioned air and/or oxygen to only a subset of the plurality of plant housings 1. With continued reference to FIG. 3, the system 100 can include a gas box 10 fluidly connected to the conduit connector 3c via a valve 9E. The valve 9E can be selectively actuatable (e.g., by a user) to allow flow of the gas from the gas box into the proximal conduit portion 3c and through the rest of the conduit assembly 3. In one embodiment, the gas box 10 can include one or more nutrients in gas or aerosol form, which can be introduced into the conduit assembly 3 and which can flow through the conduit assembly 3 and one or more plant housings 1 to provide the plants in the one or more plant housings 1 with nutrients to facilitate their growth. The nutrients can be propelled through the conduit assembly 3, for example, via the flow generated by the AC unit 7 and/or generated by the oxygen source 8, and/or generated by a separate fan (not shown) fluidly connected to the system 100.

With continued reference to FIG. 3, in operation the valve 9 can be closed, the valve 9B and the valves 9C, 9D open, and the AC unit 7 operated to provide conditioned air to the one or more plant housings 1 via the conduit assembly 3 so that the conditioned air is recirculated through the plurality of plant housings 1. In one embodiment, the valve 9C or 9D can be closed to only direct conditioned air through one branch of the closed circuit 9 (e.g., so that the conditioned air is not recirculated, but instead directed only to a subset of the plurality of plant housings 1). In still another embodiment, the valve 9 can be open to also provide a flow of oxygen, in addition to the flow of conditioned air from the AC unit 7, through the conduit assembly 3 and plurality of plant housings 1. In still another embodiment, the valve 9 can be open and the valve 9B closed so only a flow of oxygen is provided through the conduit assembly 3 and one or more plant housings 1. Accordingly, the system 100 can be selectively operated in a variety of ways to provide a flow of conditioned air, oxygen and/or nutrients to one or more of a plurality of plant housings 1 to facilitate the growth of the plants in the housings 1. Also valves 9C and 9D can be actuated so that a vacuum can be placed on the adjacent side of the oxygen 8 and AC unit 7 to promote oscillation. (pulling air through the chambers $1b'$).

FIGS. 4A-4G show embodiments of a plant housing 1, which can be used with the system 100. The plant housing 1 can include an upper housing portion $1a$ and a lower housing portion $1b$. The lower housing portion $1b$ can be generally cylindrical (e.g., a PCV pipe portion, 4 in. in diameter) and can have at least two connectors $3b$ (e.g., PVC connectors, such as ½ inch male connectors) that can couple with conduit portions $3a$ to allow interconnection between a plurality of plan housings 1. The connectors $3b$ can provide a fluid connection with the lower housing portion $1b$ so as to allow flow (e.g., of air, oxygen, nutrients) into the chamber $1b'$ (see FIG. 4E) defined by the lower housing portion $1b$. In one embodiment, the connectors $3b$ can be located about half way along the length of the lower hosing portion $1b$. In one embodiment, the lower housing portion $1b$ can have a length H2 of between about 6 and 18 inches (see FIG. 4B). However, in other embodiments, the lower housing portion $1b$ can have other lengths.

Figure 4A:
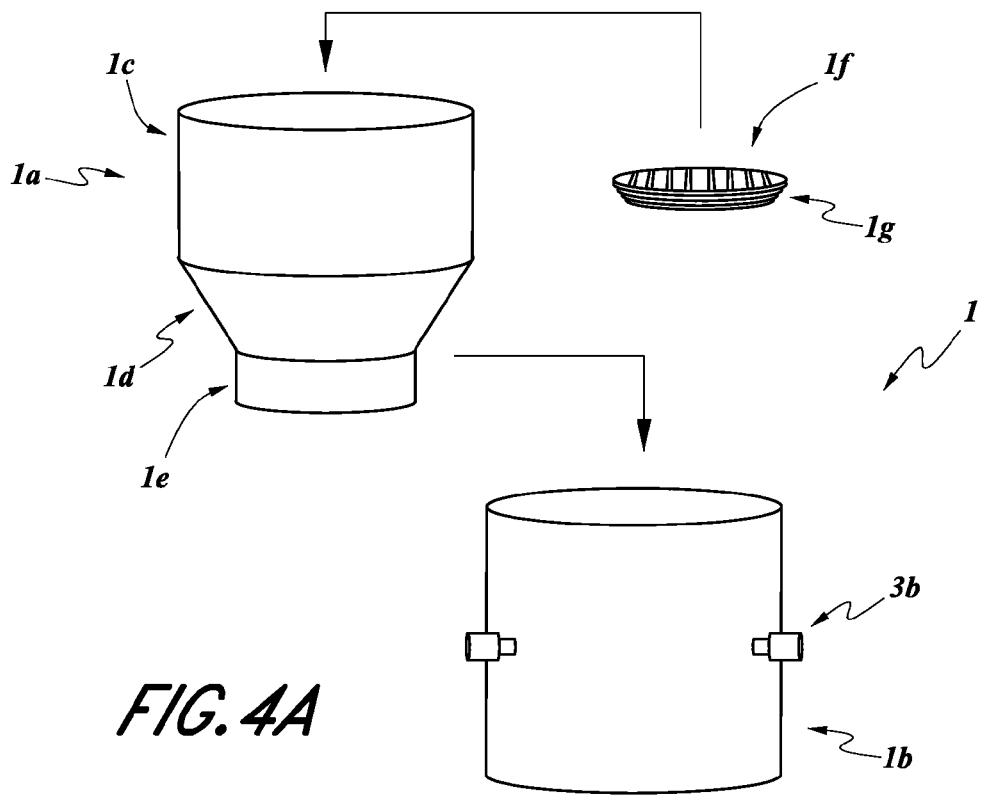
FIG. 4A is a schematic exploded view of one embodiment of a plant housing for use with an agriculture production system.
Figure 4B:
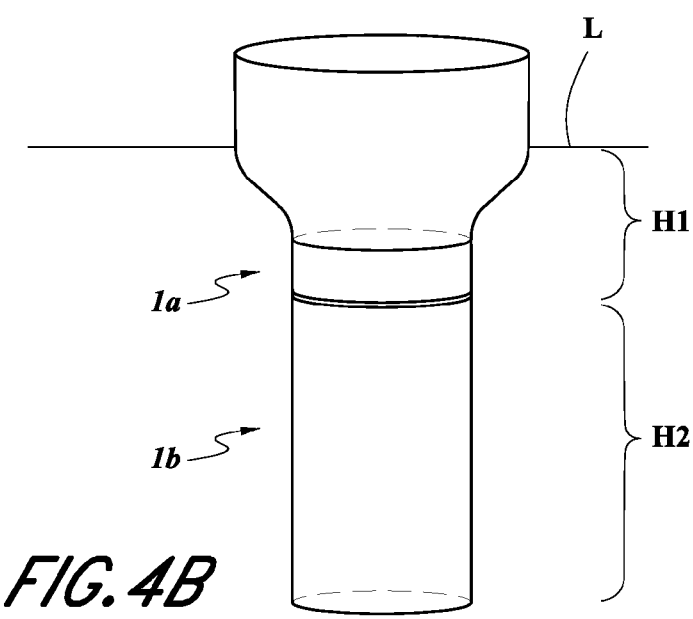
FIG. 4B is a schematic assembled view of one embodiment of a plant housing for use with an agriculture production system.
Figure 4D:
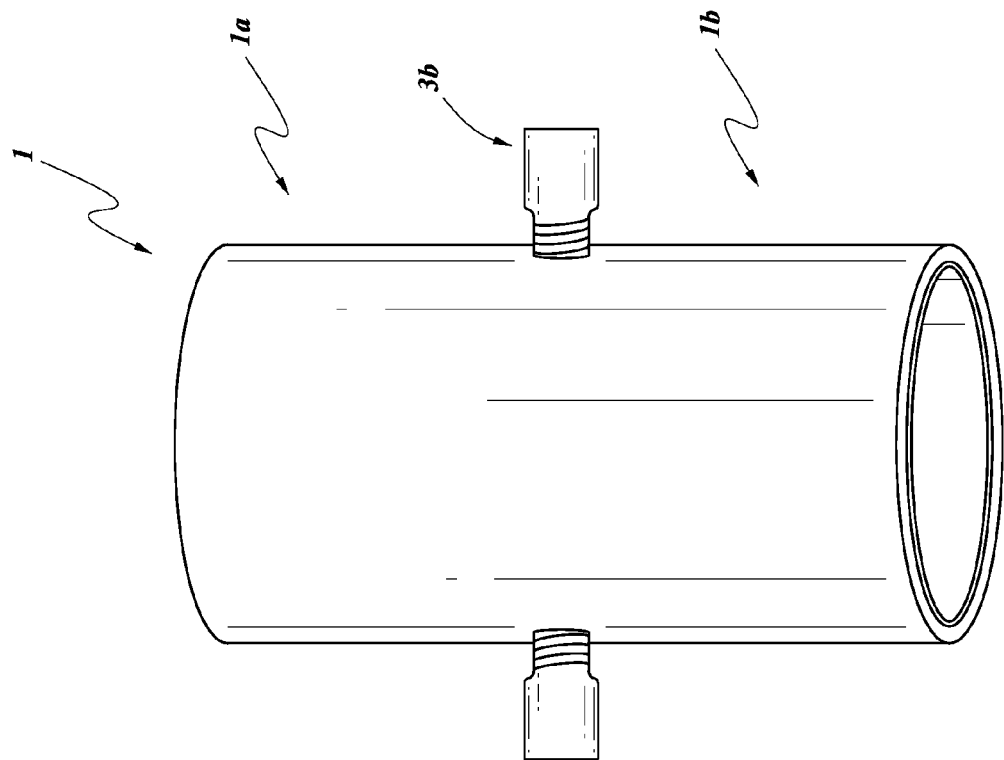
FIG. 4D is a side view of the plant housing in FIG. 4C.
Figure 4C:
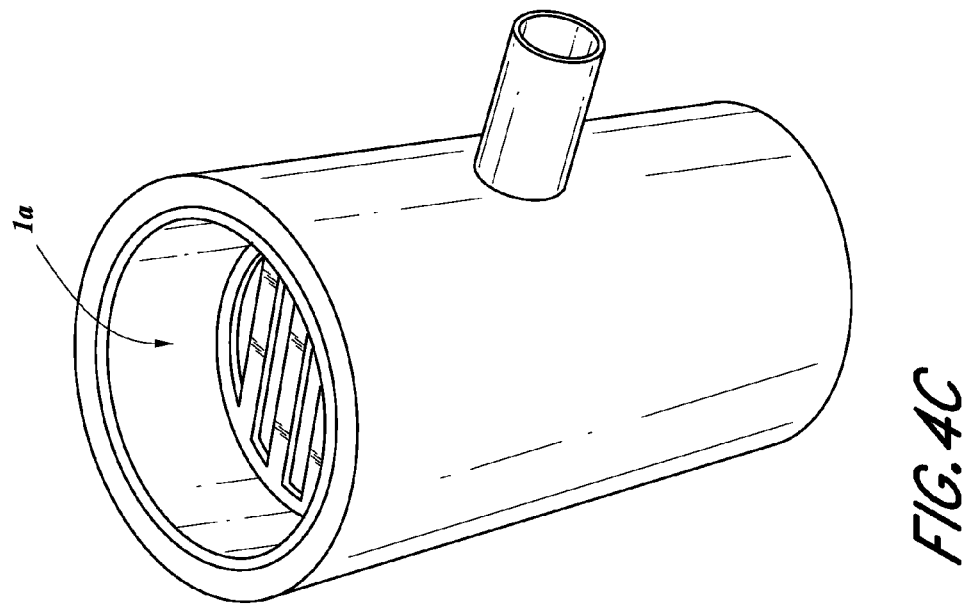
FIG. 4C is a perspective view of one embodiment of a plant housing.

In one embodiment, shown in FIG. 4A-4B, the upper housing portion $1a$ can have a generally cylindrical proximal portion $1c$, a frustroconical portion $1d$ and a generally cylindrical distal portion $1e$, where the distal portion $1e$ has a smaller diameter than the proximal portion $1c$. In one embodiment, the frustroconical portion $1d$ and cylindrical distal portion $1e$ can have a combined length H1 of between about 3 inches and 4 inches; however, in other embodiments the upper housing portion $1a$ can have other suitable lengths. The upper housing portion $1a$ can be sized such that the frustroconical portion $1d$ and cylindrical distal portion $1e$ at least partially fit into the lower housing portion $1b$, but so that the upper housing portion $1a$ remains supported above the lower housing portion $1b$ (e.g., so the upper housing portion $1a$ does not fall through the lower housing portion $1b$). In one embodiment, the cylindrical proximal portion $1c$ can have generally the same diameter as the lower housing portion $1b$ such that at least a portion of the frustroconical portion $1d$ can fit in the lower housing portion $1b$. In another embodiment, the cylindrical distal portion $1e$ can have generally the same diameter as the lower housing portion $1b$ such that the frustroconical portion $1d$ extends outside the lower housing portion $1b$. A grate if can be inserted into the upper housing portion $1a$ and rest between the frustroconical portion $1d$ and the cylindrical distal portion $1e$. In another embodiment, the upper housing portion $1a$ can have a step-down portion instead of the frustroconical portion $1d$ (see FIG. 5B). In one embodiment, the grate $1f$ can have one or more step-down portions $1g$, allowing the grate $1f$ to fit in upper housing portions $1a$ of various sizes. In one embodiment, as shown in FIGS. 4F, 4G, the grate $1f$ can be attached to the cylindrical distal portion $1e$ of the upper housing portion $1a$.

Figure 5A:
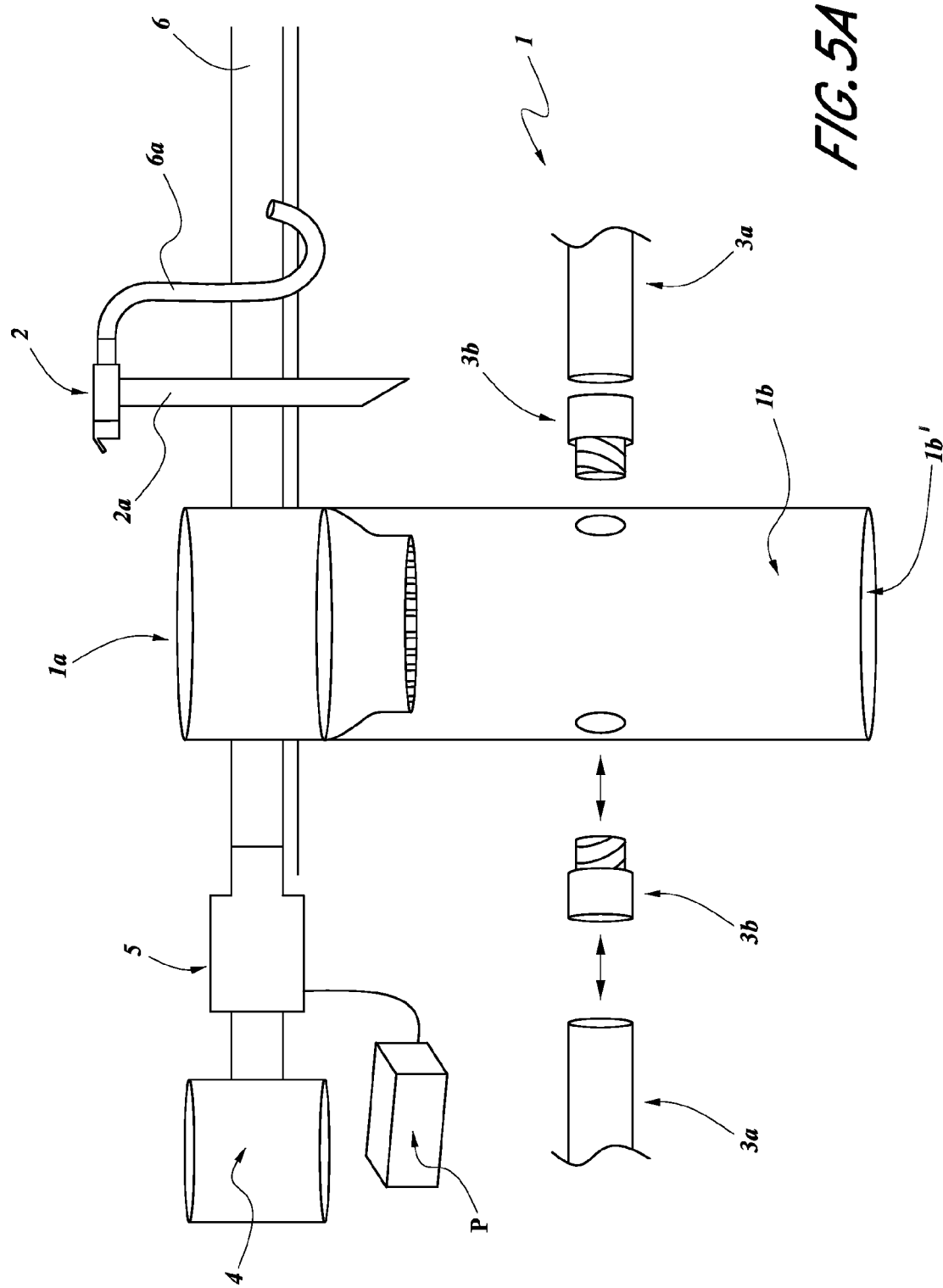
FIG. 5A is a partial side view of a portion of one embodiment of an agriculture production system.

FIG. 5A shows a cross-sectional view of one embodiment of a plant housing assembly 1. The upper housing portion $1a$ can sit on the lower housing portion $1b$ to thereby define a chamber $1b'$ into which the roots of a plant can extend, where the plant can be supported in soil within the upper housing portion $1a$. Conduit connectors $3b$ can be coupled (e.g., threaded) into holes on the lower housing portion $1b$ and can fluidly connect with other plant housings 1 via conduit portions $3a$ coupled to the conduit connectors $3b$. In the illustrated embodiment, the irrigation head 2 can direct water onto the top of the plant (e.g., direct irrigation water above the soil line). The irrigation head 2 can be supported on a support $2a$ (e.g., an irrigation spike) and connected to the irrigation header assembly 6 via an irrigation tube $6a$. As previously discussed, a pump 5 can pump water from a water supply source 4 through the irrigation heater assembly 6. In one embodiment, the pump 5 is electrically operated by power from a power source P.

Figure 5B:
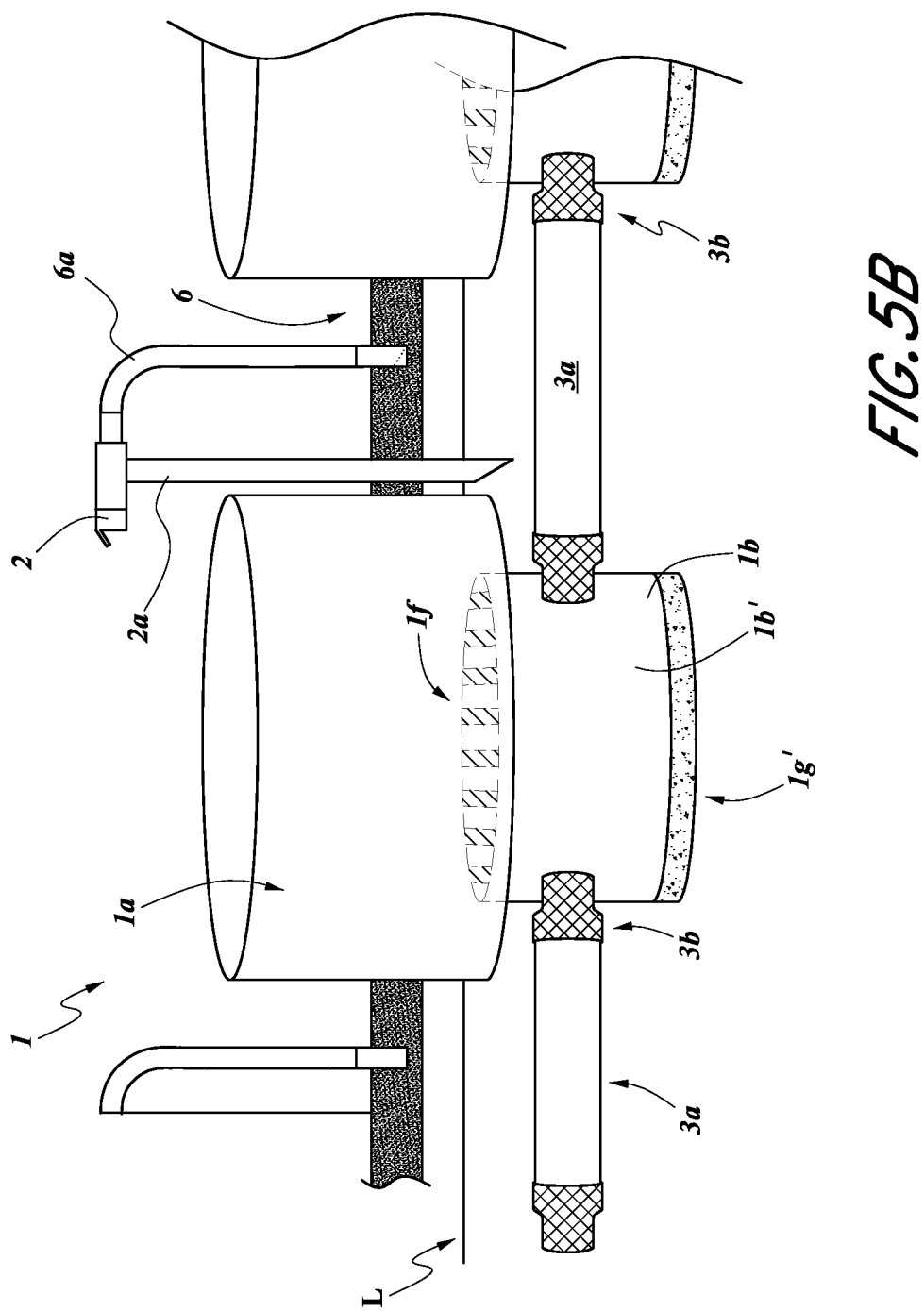
FIG. 5B is a partial side view of a portion of another embodiment of an agriculture production system.

FIG. 5B shows a cross-sectional view of another embodiment of a plant housing assembly 1. The upper housing portion $1a$ can be integral (e.g., one piece or monolithic) with the lower housing portion $1b$, which defines a chamber $1b'$ into which the roots of a plant can extend, where the plant can be supported in soil within the upper housing portion $1a$, such that the roots of the plant extend through the openings in the grate $1f$ into the chamber $1b'$. In another embodiment, the plant can be supported in soil and/or other mediums (e.g., Rockwool, grow cubes, sand) within the upper housing portion $1a$ of the housing assembly 1. Conduit connectors $3b$ can be coupled (e.g., threaded) into holes on the lower housing portion $1b$ and can fluidly connect with other plant housings 1 via conduit portions $3a$. In the illustrated embodiment, the irrigation head 2 can direct water onto the top of the plant (e.g., direct irrigation water above the soil line into the upper housing portion $1a$ via gravity). The irrigation head 2 can be supported on a support $2a$ (e.g., an irrigation spike) and connected to the irrigation header assembly 6 via an irrigation tube $6a$. In the illustrated embodiment, the plant housing 1 can also include a liquid permeable membrane $1g'$ on the bottom of the lower housing portion $1b$, which can advantageously inhibit soil from extending into the chamber $1b'$ from below, as well as provide for increased moisture in the chamber $1b'$. The liquid permeable membrane $1g'$ can consist of peat moss or other semi-permeable membrane material that inhibits (e.g., prevents) soil sliding up into the chamber $1b'$, which can affect air flow through the chamber $1b'$ and root development. Additionally, the liquid permeable membrane $1g'$ can advantageously slow down the water loss in the chamber $1b'$ and create a more humid environment in the chamber $1b'$ for the plant roots.

Figure 6A:
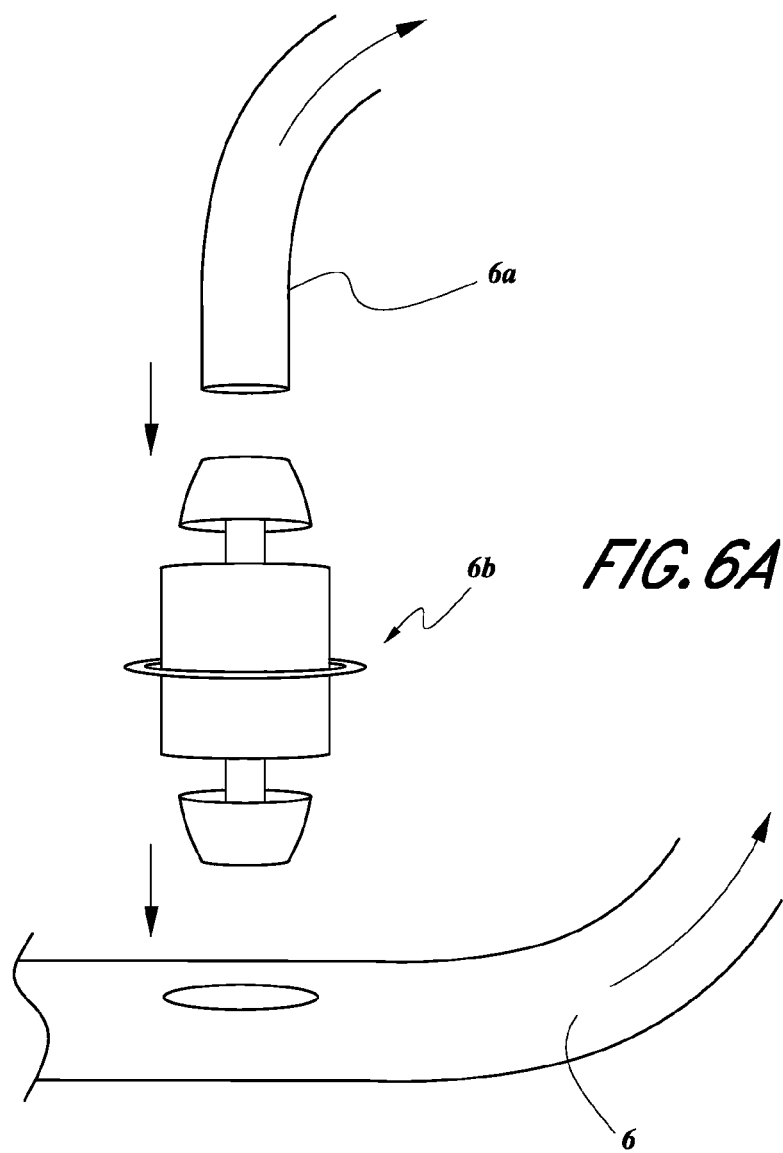
FIG. 6A is a schematic exploded view of a portion of one embodiment of an agriculture production system.
Figure 6B:
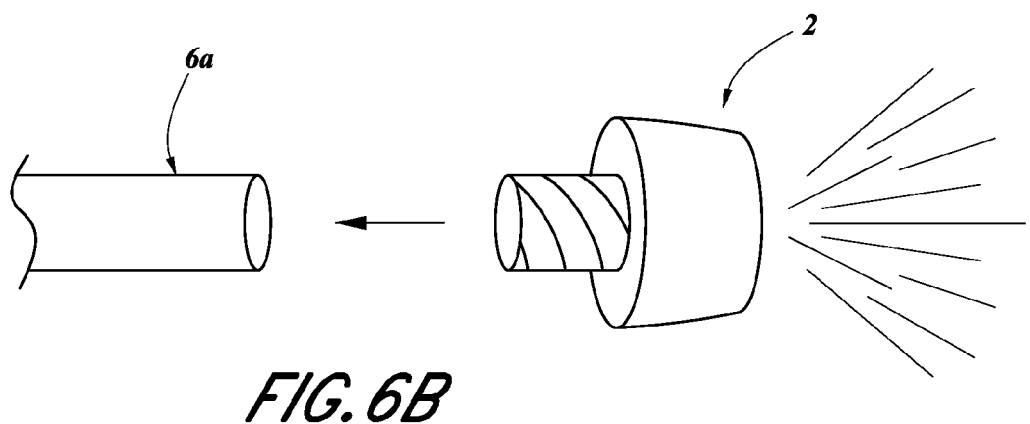
FIG. 6B is a schematic exploded view of one embodiment of an irrigation head connection for use with an agriculture production system.

FIG. 6A shows one embodiment of an irrigation tube $6a$ connected to the irrigation header assembly 6 via an irrigation connector $6b$. FIG. 6B shows an irrigation head 2 that can be connected (e.g., threaded) onto an end of an irrigation tube $6a$.

Figure 7:
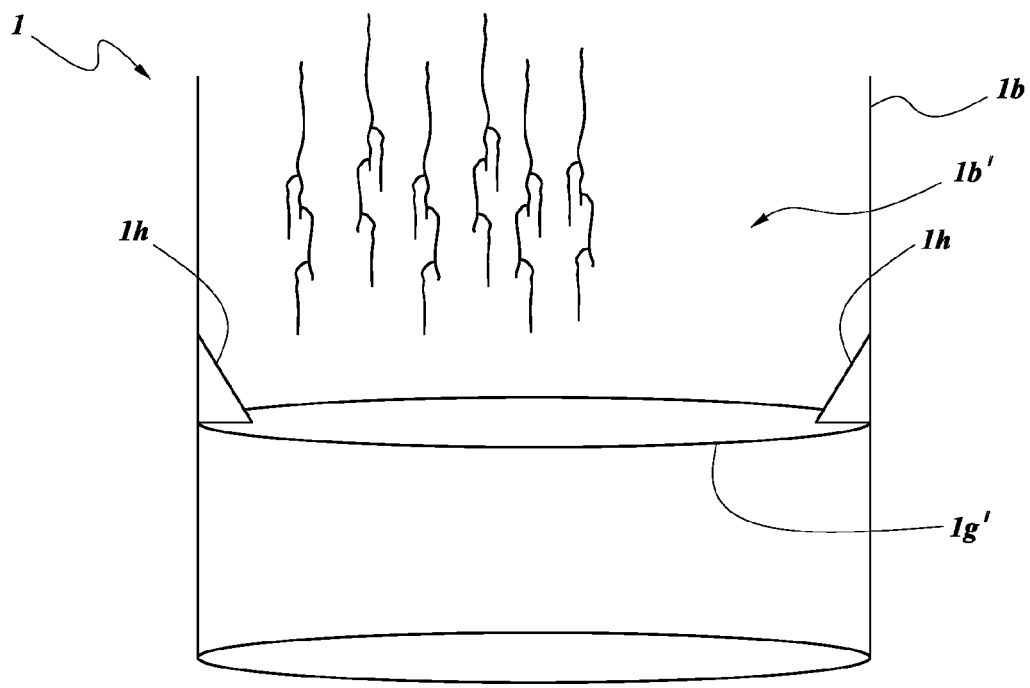
FIG. 7 is a schematic side view of a portion of another embodiment of a plant housing for use with an agriculture production system.

FIG. 7 shows another embodiment of a plant housing 1. FIG. 7 shows a portion of a plant housing 1 and how the roots extend into the chamber 1b' of the lower housing portion 1b. The housing can include a semi-permeable membrane 1g' (which can be made of peat moss or other semi-permeable membrane). The lower housing portion 1b can include one or more membrane inhibitors 1h that inhibit (e.g., prevent, or stop) sliding of the semi-permeable membrane 1g' into the chamber 1b', thereby ensuring that soil does not slide up into the chamber 1b', as discussed above.

Figure 8:
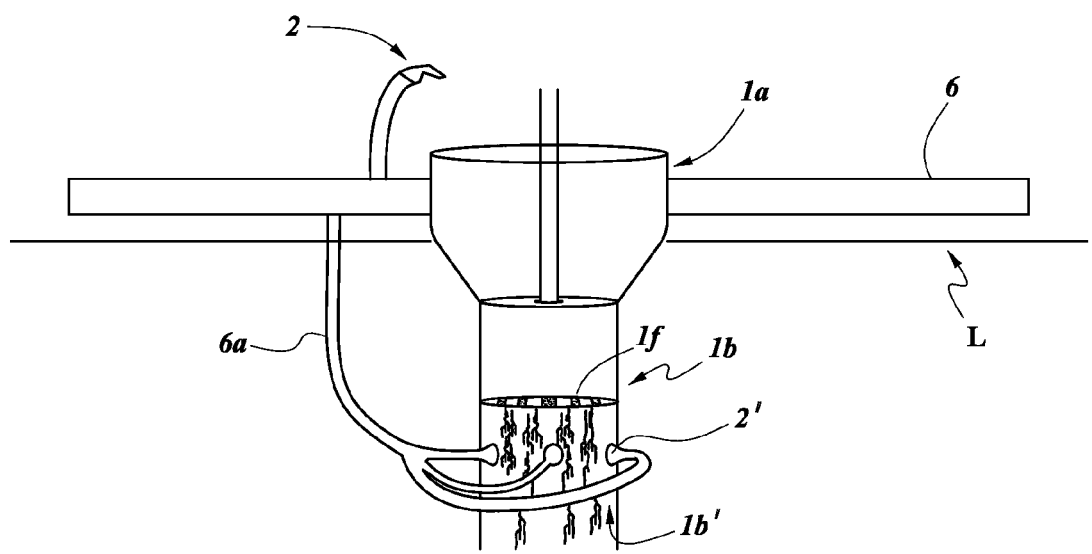
FIG. 8 is a schematic side view of a portion of another embodiment of a plant housing for use with an agriculture production system.

FIG. 8 shows another embodiment of a plant housing 1. In the illustrated embodiment, one or more irrigation heads 2' connect to the lower housing portion 1b (e.g., below the soil line) to direct irrigation water into the chamber 1b' directly. The one or more irrigation heads 2' can be arranged circumferentially about the lower housing portion 1b to ensure all of the roots in the chamber 1b' are exposed to the irrigation water. In one embodiment, one or more irrigation heads 2 can also direct irrigation water above the soil line L onto the plant.

FIGS. 9A-9C show different embodiments of a grate 1f. The grate 1f can be relatively short (FIG. 9A), such as have a height L1 of about 2 inches, and have a stepped-up outer surface, allowing the grate 1f to fit plant housings 1 of different diameters. In other embodiments, the grate 1f can be relatively tall (FIG. 9B), such as have a height L2 of about 4.5 inches, and also have a stepped out outer surface, so it steps from a maximum outer diameter M1 to a minimum outer diameter M2. In one embodiment, the maximum outer diameter M1 can be about 5 inches. In one embodiment, the minimum outer diameter M2 can be about 3½ inches. In another embodiment, the minimum outer diameter M2 can be about 3¾ inches. However, the grate 1f can have other suitable dimensions for height L1, L2, maximum outer diameter M1 and minimum outer diameter M2. The grate 1f can have one or more openings 1f through which the roots of the plant can extend into the chamber 1b'. Advantageously, the grate 1f can allow the plant roots to extend through the openings 1f while retaining the soil in the upper housing portion 1a to support the plant therein.

Figure 9E:
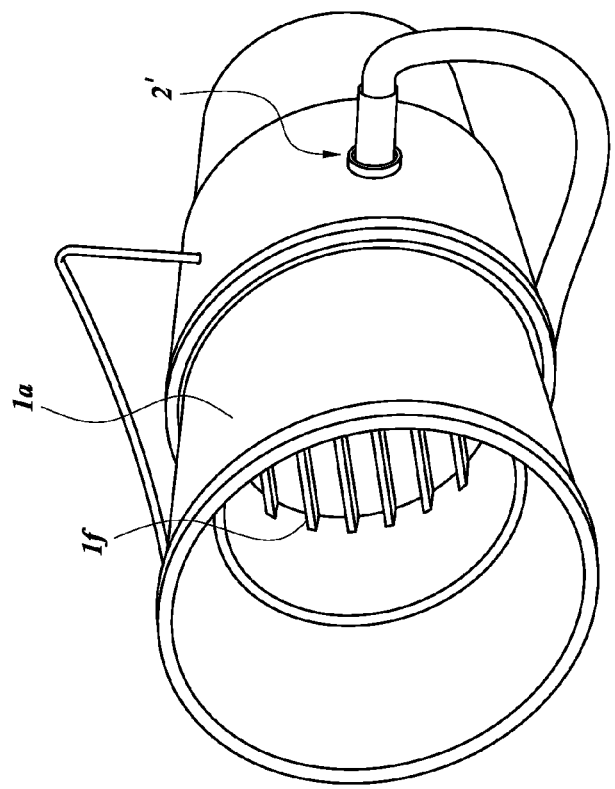
FIG. 9E is a schematic side view of the plant housing of FIG. 9D.
Figure 9D:
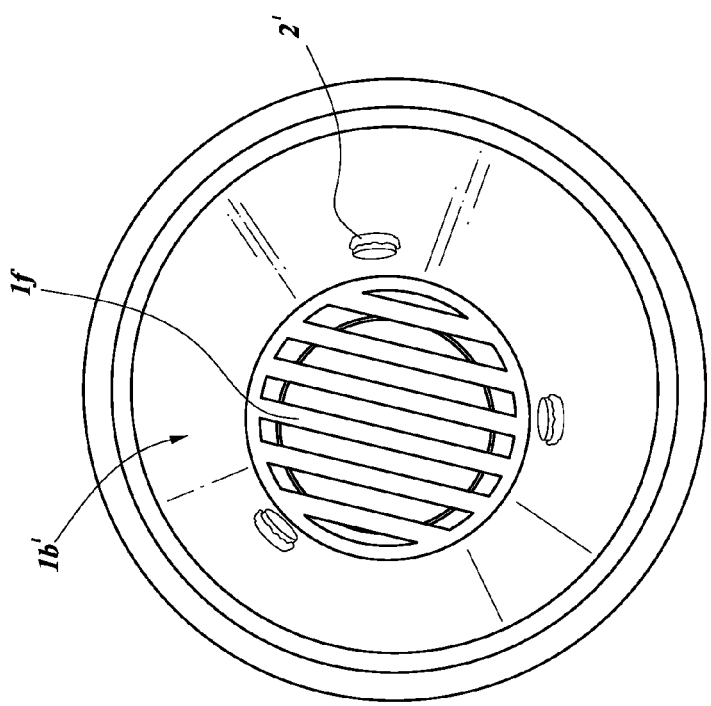
FIG. 9D is a schematic bottom view of another embodiment of a plant housing for use with the agriculture production system.

FIGS. 9D-9E show another embodiment of a plant housing 1, similar to the embodiment in FIG. 8. In the illustrated embodiment, three misters 2' are provided in the chamber 1b' below the grate 1f to irrigate the roots in the chamber 1b' with water.

Figure 10A:
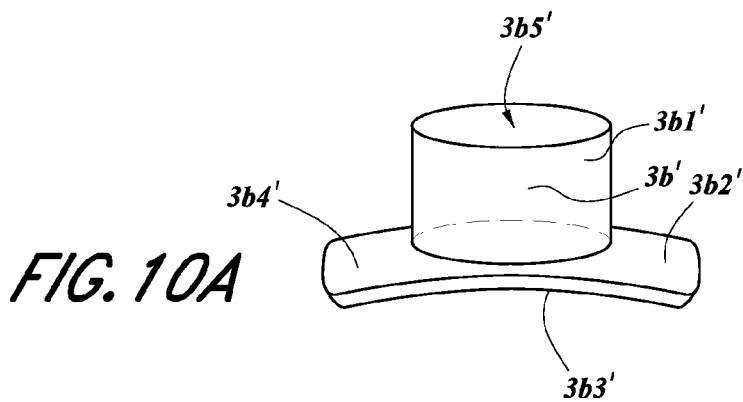
FIG. 10A is a schematic perspective view of another embodiment of a conduit connector for use with the agriculture production system.
Figures 10B, 10C:
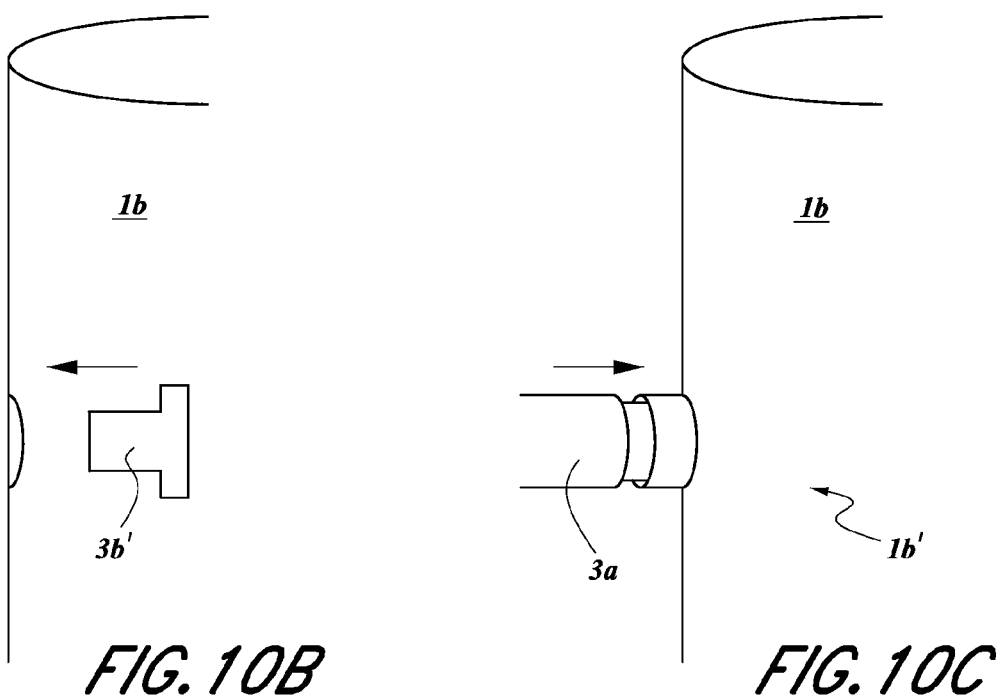
FIG. 10B is a schematic partial side view of the conduit connector of FIG. 10A being coupled to a housing of the agriculture production system.
FIG. 10C is a schematic partial side view of the conduit connector of FIG. 10A coupled to a housing of the agriculture production system, a conduit portion coupled to the conduit connector.
Figure 10D:
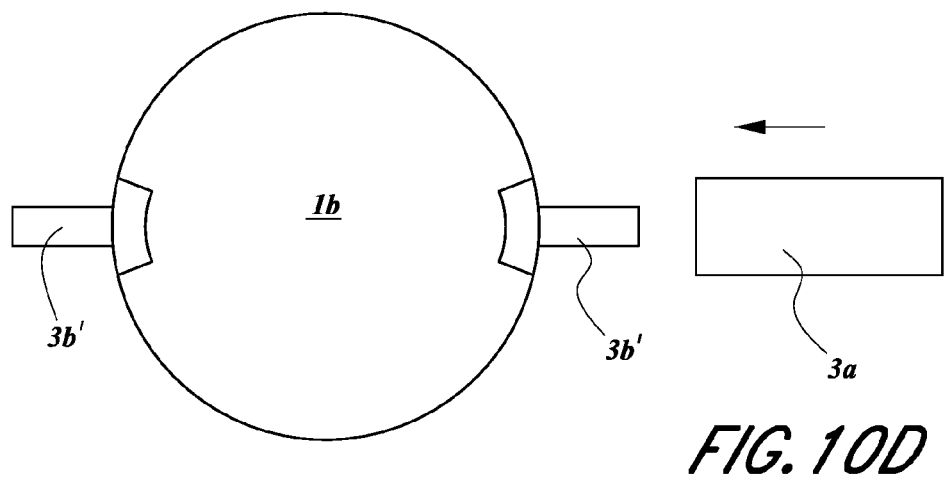
FIG. 10D is a schematic top view of the conduit connector of FIG. 10A coupled to a housing of the agriculture production system, a conduit portion coupled to the conduit connector.

FIGS. 10A-10D show another embodiment of a plant housing assembly 1'. A conduit connector 3b' can have a cylindrical portion 3b1' and a shoulder portion 3b2'. The shoulder portion 3b2' can have an inner concave surface 3b3' and an outer convex surface 3b4'. An opening or channel 3b5' can extend through the cylindrical portion 3b1' and shoulder portion 3b2'. The conduit connectors 3b' can be coupled to the lower housing portion 1b by inserting the connectors 3b' from inside the lower housing portion 1b through openings formed in the lower housing portion 1b such that the outer convex surface 3b4' contacts the inner surface of the lower housing portion 1b, as shown in FIGS. 10B and 10D. The conduit portion 3a can then be coupled to the cylindrical portion 3b1' of the conduit connector 3b' by sliding the conduit portion 3a over the cylindrical portion 3b1', as seen in FIGS. 10C-10D. In one embodiment, an adhesive can be applied to the outer surface of the cylindrical portion 3b1' prior to sliding the conduit portion 3a over it to thereby fixedly couple the conduit portion 3a to the conduit connector 3b' (e.g., without requiring threads on the conduit portion 3a or conduit connector 3b' to couple them together). In some embodiments, an adhesive can also be applied to the outer convex surface 3b4' prior to inserting the cylindrical portion 3b1' through the opening in the lower housing portion 1b. The conduit connector 3b' can be made of the same material as the conduit portion 3a (e.g., PVC, a plastic material, etc.). The conduit connector 3b' once coupled to the conduit portion 3a can provide an air tight connection between chambers 1b' of the housings 1'.

Figure 11:
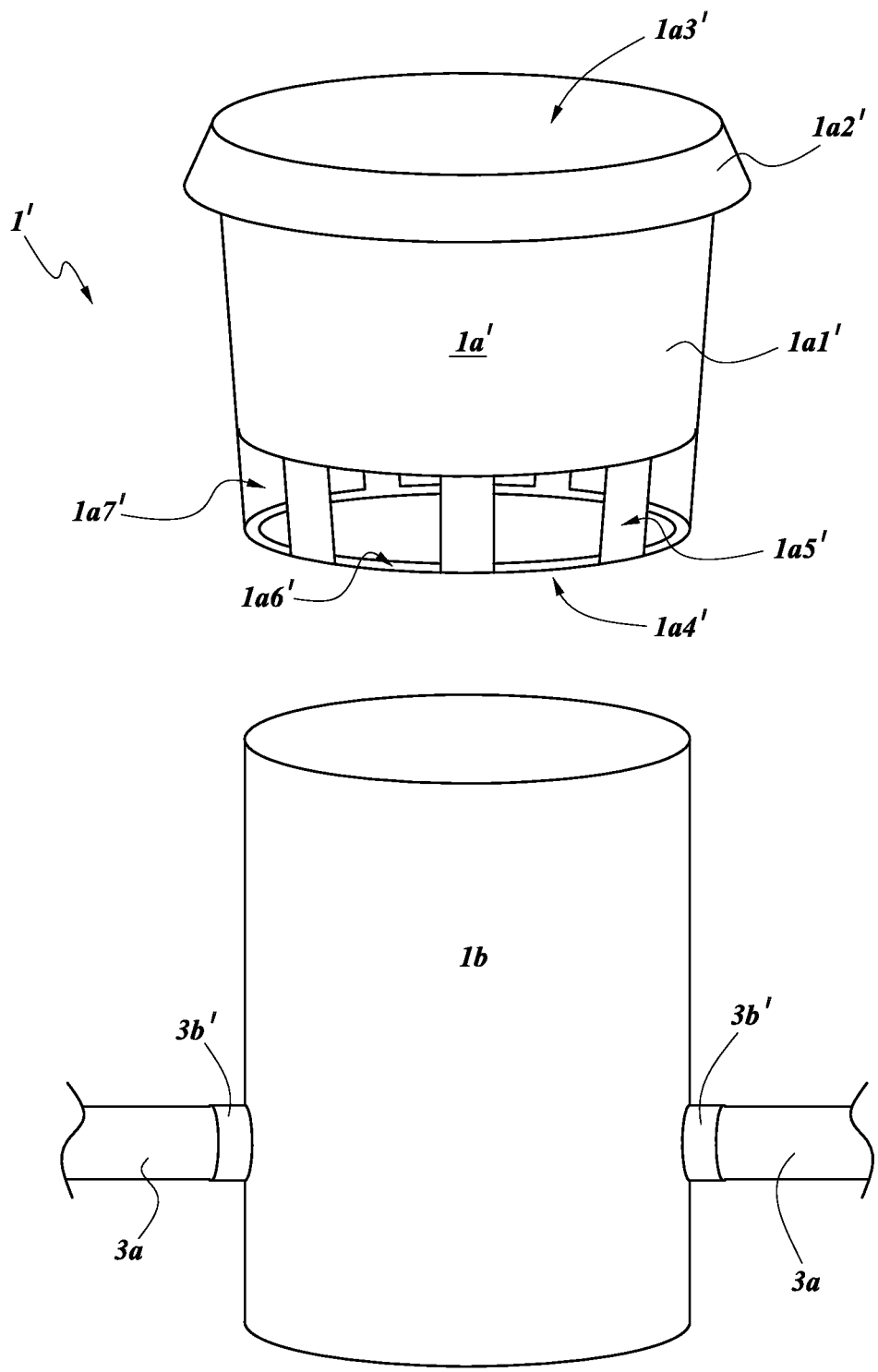
FIG. 11 is a schematic side view of another embodiment of a housing for use with the agriculture production system.

FIG. 11 shows another embodiment of a plant housing assembly 1'. The plant housing 1' can have the lower housing portion 1b as shown in FIGS. 10A-10D, where the lower housing portion 1b is interconnected with conduit portions 3a via conduit connectors 3b'. The housing assembly 1' can have an upper housing portion 1a' with a cylindrical body 1a1' that can fit within the cylindrical body of the lower housing portion 1b. The upper housing portion 1a' can have a lip or shoulder 1a2' that can sit on top of the lower housing portion 1b when the upper housing portion 1a' is coupled thereto to thereby support the upper housing portion 1a' at least partially above the lower housing portion 1b and inhibit the upper housing portion 1a' from falling through the lower housing portion 1b. The upper housing portion 1a' can include an opening 1a3' at a proximal end thereof that extends to an opening 1a4' at a distal end of the upper housing portion 1a'. The upper housing portion 1a' can have one or more (e.g. a plurality) of arms 1a5' that extend from the cylindrical body 1a1' to a support ring or ledge 1a6' that defines the distal opening 1a4'. Additionally, side openings 1a7' can be defined between arms 1a5' on a side of the upper housing portion 1a'. The ring 1a6' can support a medium, such as Rockwool, grow cubes or other suitable medium on which plants can grow, without having a mesh or grate extending across the distal opening 1a4', so that the plant roots can extend through the distal opening 1a4' and/or side openings 1a7' into the chamber 1b' in the lower housing portion 1b. In one embodiment, the upper housing portion 1a' can be formed as a single piece (e.g., monolithic).

FIGS. 12-13B show components of another embodiment of an agriculture production system 200. The system 200 can be similar to the system 100 and have the same configuration and components, except as described below.

The system 200 can have a proximal connector 202 coupled to a fan 210 (e.g., a battery operated fan that can direct airflow through a distal connector, through a heating portion 206. A distal end of the heating portion 208 can be coupled to a conduit assembly 3'. As shown in FIG. 12, at least a portion of the heating portion 206 can be disposed above the soil line L and at least a portion of the heating portion 206 can be disposed below the soil line L. In another embodiment, the heating portion 206 is disposed completely above the soil line L. The conduit assembly 3' can be similar to the conduit assembly 3 of system 100 and supply air to multiple plant housings 1, 1' interconnected by conduit portions 3a. the proximal connector 202, fan 210, distal connector 204 and heating portion 206 can replace the AC unit 7 and/or oxygen supply 8 of system 100 upstream of the valve 9. The heating portion 206 can have a branch member 230 (which can be above the soil line L), where a heating source 220 can heat the branch member 230 to heat air flowing through the heating portion 206.

With references to FIGS. 13A, 13B, at least a section of the conduit assembly 3' can have one or more conditioning portions 240, preferably disposed below the soil line L. The conditioning portion 240 can have a cylindrical member 242 and one or more fin members 246 with an inner portion 246a that extends through openings 244 in the wall of the cylindrical member 242 and into the flow passageway 243 of the cylindrical member 242. The one or more fin members 246 can have an outer portion 246b that extends outside the cylindrical member 242. In one embodiment, the one or more fin members 246 can be made of metal or another suitable material that conducts heat. In one embodiment the one or more fin members 246 can be bars (e.g., metal bars). In use, the inner portion 246a of the one or more fin members 246 can contact air flowing through the passageway 243 so that heat from the air is transferred to the fin members 246 (e.g., via convection heat transfer). Said heat can be transferred from the inner portion 246a to the outer portion 246b and to the surrounding soil via conduction heat transfer. Accordingly, the airflow downstream of the conditioning portion 240 can have a lower temperature than the air upstream of the conditioning portion 240. Said one or more conditioning portions 240 can be used to condition air flowing through the system 200 and can be used instead of an AC unit, such as the AC unit in system 100. In one embodiment, the fin members 246 can be sealed (e.g., with a sealant) at the location of the openings in the cylindrical member 242 that the fin members 246 pass through to inhibit leakage of air therethrough.

In one embodiment, the branch member 230 can be one or more fin members, such as the fin members 246, that extend into the passageway of the heating portion 206. In this embodiment, the heating source 220 can heat an outer portion of the one or more fin members and said heat can be transferred to an inner portion of said fin members via conduction heat transfer, and thereafter transferred to the air flowing therethrough to increase the temperature of the air flowing through the system 200. In one embodiment, the heating source 220 can be a blow torch. However, in other embodiments, other suitable heating sources 220 can be used.

Though the embodiments above are disclosed in connection with an outdoor setting, one of skill in the art will recognize that the system disclosed above can also be used in an indoor setting. In one embodiment, a user can turn off the light and cool the root zone (simultaneously) to imitate nightfall and trick the plant into thinking the day is shorter than it is, thus shortening the life cycle of the plant. For example, if a typical plant takes 90 days to mature and produce fruit, in this system you could turn the light off every 5 hrs for a 3 hr period, making the plant think a day is 8 hours and fitting three "days" into one 24 hour period and shortening the production time to 30 days and speeding up harvest time.

The system and method disclosed above can advantageously allow a user to grow plants in arid conditions unsuitable for agriculture (e.g., desert). Additionally, the system above can advantageously facilitate and enhance the growth of plants relative to plants grown in traditional soil based agriculture by controlling the temperature, nutrient and/or element and environment (e.g., humidity) of the root zone of the plant. Further, the system above can advantageously increase the efficiency in water use by directing water through gravity into the upper soil profile and lower chamber of the plant housings, thereby avoiding water run-off or dispersion.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An agriculture production system, comprising:
a plurality of plant housings interconnected by conduit portions of a conduit assembly, each of the plant housings comprising an upper housing portion configured to support a plant in a growing media therein and a lower housing portion defining a chamber cavity below the upper housing portion so that one or more roots of the plant extend into the chamber, said conduit portions fluidly interconnecting the chambers of the plurality of plant housings;
a conditioned air unit coupled to at least a portion of the conduit assembly and configured to condition air that flows through the conduit assembly into the chambers of the plurality of plant housings; and
a water supply assembly comprising a plurality of irrigation units, where each irrigation unit is associated with one of the plurality of plant housings and configured to deliver water to its associated plant housing from a water supply source,
wherein the plurality of plant housings are arranged in a circuit allowing conditioned air to flow through the chambers of the plurality of plant housings to thereby control one or both of a temperature and humidity in said chambers to promote root development and plant growth.

2. The system of claim 1, wherein the conditioned air unit is an electric air conditioning unit disposed above a soil line and operable to provide conditioned air through the conduit assembly into the chambers of the plurality of plant housings, and wherein at least a portion of the plant housings is disposed below the soil line.

3. The system of claim 1, wherein the conditioned air unit comprises a conduit portion and one or more fin members extending into a passage of the conduit portion and having an inner portion in said passage and an outer portion outside said passage, wherein heat is transferred between air flow through the passage and the environment outside the conduit portion via the one or more fin members.

4. The system of claim 3, further comprising a heating source operable to heat the outer portion of the one or more fin members to thereby transfer heat to the inner portion of the one or more fin members and to air flow through the conduit portion.

5. The system of claim 1, further comprising an oxygen source selectively fluidly coupled to the conduit assembly to direct a flow of oxygen into the chambers of the plurality of plant housings via the conduit assembly to expose the root zone in each chamber to said oxygen flow.

6. The system of claim 1, further comprising a nutrient source selectively fluidly coupled to the conduit assembly to direct a flow of nutrients in gas form into the chambers of the plurality of plant housings via the conduit assembly to expose the root zone in each chamber to said nutrients.

7. The system of claim 1, further comprising a fan fluidly coupled to the conduit assembly, the fan operable to oscillate flow through the chambers.

8. The system of claim 1, wherein the upper housing portion of at least one of the plurality of plant housings comprises a grate configured to support soil thereon while allowing roots of the plant to pass therethrough into the chamber.

9. The system of claim 8, wherein the grate has a stepped portion allowing the grate to fit in said upper housing portion, the upper housing portion having one of a plurality of diameters.

10. The system of claim 1, wherein the upper housing portion of at least one of the plurality of plant housings comprises a distal opening therein and a ledge configured to support the growing media thereon while allowing roots of the plant to pass therethrough into the chamber.

11. The system of claim 1, wherein the lower housing portion of at least one of the plurality of plant housings comprises a liquid permeable membrane at a distal end thereof that inhibits passage of soil into the chamber through the distal end of the lower housing portion and facilitates increased humidity in the chamber of the lower housing portion.

12. The system of claim 1, wherein at least one of the irrigation units comprises an irrigation head configured to deliver water onto the top of the upper housing portion of at least one of the plurality of plant housings so that water is directed to the root zone of the plant in the chamber via gravity to efficiently deliver water to the plurality of plant housings while inhibiting water runoff or dispersion.

13. The system of claim 1, wherein at least one of the irrigation units comprises one or more irrigation heads coupled to the lower housing portion of at least one of the plurality of plant housings and configured to spray water into the chamber of the lower housing portion to direct water to the root zone of the plant in the chamber to efficiently deliver water to the plurality of plant housings while inhibiting water runoff or dispersion.

14. An agriculture production system, comprising:
a plurality of plant housings interconnected by conduit portions of a conduit assembly, each of the plant housings comprising an upper housing portion configured to support a plant in a growing media therein and a lower housing portion defining a chamber cavity below the upper housing portion so that one or more roots of the plant extend into the chamber, said conduit portions fluidly interconnecting the chambers of the plurality of plant housings;

a conditioned air unit coupled to at least a portion of the conduit assembly and configured to condition air that flows through the conduit assembly into the chambers of the plurality of plant housings;

an oxygen source coupled to the conduit assembly and configured to selectively direct a flow of oxygen into the chambers of the plurality of plant housings via the conduit assembly to expose the root zone in each chamber to said oxygen flow; and a water supply assembly comprising a plurality of irrigation units, where each irrigation unit is associated with one of the plurality of plant housings and configured to deliver water to its associated plant housing from a water supply source, wherein the plurality of plant housings are arranged in a circuit allowing conditioned air and oxygen to flow through the chambers of the plurality of plant housings to thereby control one or both of a temperature and humidity in said chambers to promote root development and plant growth.

15. The system of claim 14, further comprising a nutrient source selectively fluidly coupled to the conduit assembly to direct a flow of nutrients in gas form into the chambers of the plurality of plant housings via the conduit assembly to expose the root zone in each chamber to said nutrients.

16. The system of claim 14, wherein the conditioned air unit is an electric air conditioning unit disposed above a soil line and operable to provide conditioned air through the conduit assembly into the chambers of the plurality of plant housings, and wherein at least a portion of the plant housings is disposed below the soil line.

17. The system of claim 14, wherein the conditioned air unit comprises a conduit portion and one or more fin members extending into a passage of the conduit portion and having an inner portion in said passage and an outer portion outside said passage, wherein heat is transferred between air flow through the passage and the environment outside the conduit portion via the one or more fin members.

18. The system of claim 14, wherein the lower housing portion of at least one of the plurality of plant housings comprises a liquid permeable membrane at a distal end thereof that inhibits passage of soil into the chamber through the distal end of the lower housing portion and facilitates increased humidity in the chamber of the lower housing portion.

19. The system of claim 14, wherein at least one of the irrigation units comprises an irrigation head configured to deliver water onto the top of the upper housing portion of at least one of the plurality of plant housings so that water is directed to the root zone of the plant in the chamber via gravity to efficiently deliver water to the plurality of plant housings while inhibiting water runoff or dispersion.

20. The system of claim 14, wherein at least one of the irrigation units comprises one or more irrigation heads coupled to the lower housing portion of at least one of the plurality of plant housings and configured to spray water into the chamber of the lower housing portion to direct water to the root zone of the plant in the chamber to efficiently deliver water to the plurality of plant housings while inhibiting water runoff or dispersion.

* * * * *